(12) United States Patent
Ying et al.

(10) Patent No.: US 11,470,671 B2
(45) Date of Patent: Oct. 11, 2022

(54) ACTIVATING A PACKET DATA UNIT (PDU) SESSION USING DOWNLINK INFORMATION

(71) Applicant: HUAWEI TECHNOLOGIES CO., LTD., Guangdong (CN)

(72) Inventors: Jiangwei Ying, Beijing (CN); Yanmei Yang, Beijing (CN); Meng Li, Beijing (CN); Hui Ni, Beijing (CN); Yan Wang, Beijing (CN)

(73) Assignee: Huawei Technologies Co., Ltd., Guangdong (CN)

( * ) Notice: Subject to any disclaimer, the term of this patent is extended or adjusted under 35 U.S.C. 154(b) by 17 days.

(21) Appl. No.: 17/066,927

(22) Filed: Oct. 9, 2020

(65) Prior Publication Data

US 2021/0029770 A1      Jan. 28, 2021

Related U.S. Application Data

(63) Continuation of application No. PCT/CN2019/081548, filed on Apr. 4, 2019.

(30) Foreign Application Priority Data

Apr. 10, 2018   (CN) .......................... 201810317648.X

(51) Int. Cl.
| | | |
|---|---|---|
| *H04W 76/18* | (2018.01) | |
| *H04W 76/12* | (2018.01) | |
| *H04W 76/27* | (2018.01) | |

(52) U.S. Cl.
CPC ........... *H04W 76/18* (2018.02); *H04W 76/12* (2018.02); *H04W 76/27* (2018.02)

(58) Field of Classification Search
CPC ..... H04W 76/18; H04W 76/12; H04W 76/27; H04W 28/04; H04W 48/02; H04W 12/02; H04W 29/06551; H04W 76/10
See application file for complete search history.

(56) References Cited

U.S. PATENT DOCUMENTS

2011/0320194 A1   12/2011   Shlomot et al.
2016/0142999 A1   5/2016    Bhaskaran et al.
(Continued)

FOREIGN PATENT DOCUMENTS

| CN | 101094096 A | 12/2007 |
|---|---|---|
| CN | 102124778 A | 7/2011 |

(Continued)

OTHER PUBLICATIONS

Office Action issued in Chinese Application No. 201810317648.X dated Nov. 4, 2020, 16 pages (with English translation).

(Continued)

*Primary Examiner* — Mewale A Ambaye
(74) *Attorney, Agent, or Firm* — Fish & Richardson P.C.

(57) ABSTRACT

This application provides a communication method and apparatus, to resolve a problem that a PDU session of a terminal in an inactive mode fails to be activated. The method performed by a first core network device includes: sending first downlink information to a first RAN node, where the first downlink information is used by the first RAN node to activate a PDU session of a terminal, and the PDU session is in an inactive state; receiving indication information from the first RAN node, where the indication information indicates that the PDU session fails to be activated; and sending second downlink information to a second RAN node based on the indication information, where the second downlink information is used by the second RAN node to activate the PDU session of the terminal. This application relates to the field of communications technologies.

17 Claims, 18 Drawing Sheets

(56) References Cited

U.S. PATENT DOCUMENTS

| | | | |
|---|---|---|---|
| 2016/0352641 A1 | 12/2016 | Suryavanshi | |
| 2017/0150336 A1 | 5/2017 | Dunn et al. | |
| 2018/0376444 A1* | 12/2018 | Kim | H04W 74/0833 |
| 2019/0082376 A1* | 3/2019 | Hong | H04W 76/10 |
| 2019/0261449 A1* | 8/2019 | Kim | H04L 65/1046 |
| 2019/0335392 A1* | 10/2019 | Qiao | H04W 8/18 |
| 2020/0107213 A1* | 4/2020 | Park | H04L 43/12 |

FOREIGN PATENT DOCUMENTS

| | | |
|---|---|---|
| CN | 102577449 A | 7/2012 |
| CN | 103987092 A | 8/2014 |
| CN | 104584633 A | 4/2015 |
| CN | 105472668 A | 4/2016 |
| CN | 106658758 A | 5/2017 |
| CN | 107040340 A | 8/2017 |
| CN | 107637121 A | 1/2018 |
| CN | 107667559 A | 2/2018 |
| CN | 107770828 A | 3/2018 |
| CN | 107846703 A | 3/2018 |
| EP | 2645803 A1 | 10/2013 |
| WO | 2011002244 A2 | 1/2011 |
| WO | 2018058437 A1 | 4/2018 |

OTHER PUBLICATIONS

Qualcomm Incorporated, "RAN Paging Handling," 3GPP TSG-RAN WG3 Meeting #99, R3-181088, Athens, Greece, Feb. 26-Mar. 2, 2018, 8 pages.

Office Action issued in Japanese Application No. 2020-551532 dated Dec. 14, 2021, 6 pages (with English translation).

Extended European Search Report issued in European Application No. 19784604.1 dated May 6, 2021, 11 pages.

Huawei, "DL signalling handling in Inactive state," 3GPP TSG-RAN3 Meeting #99, R3-180976, Athens, Greece, Feb. 26-Mar. 2, 2018, 5 pages.

Huawei, HiSilicon, "Clarification on NAS recovery procedure in RRC Inactive," 3GPP TSG-SA2 Meeting #126, S2-182823, Montreal, Canada, Feb. 26-Mar. 2, 2018, 3 pages.

Huawei, HiSilicon, "TS 23.502 pCR on Control of Messages triggering Paging at AMF," SA WG2 Meeting #124, S2-179591, Reno, Nevada, USA, Nov. 27-Dec. 1, 2017, 14 pages.

Catt, "Handling of DL signallings," 3GPP TSG RAN WG3 #97bis, R3-173608, Prague, Czech Republic, Oct. 9-13, 2017, 4 pages.

Office Action issued in Korean Application No. 2020-7030403 dated Sep. 14, 2021, 13 pages (with English translation).

Kolias et al., "Attacks and Countermeasures on 802.16: Analysis and Assessment" IEEE Communications Surveys & Tutorials, Mar. 2012, 28 pages.

NTT Docomo, Inc., "New Radio (NR) Access Technology," 3GPP TSG RAN meeting #76, RP-1711505, West Palm Beach, USA, Jun. 5-8, 2017, 218 pages.

Office Action issued in Chinese Application No. 201810317648.X dated May 26, 2021, 7 pages (with English translation).

Wu Qiang, "Research and Simulation of Mobility Management in LTE-A Heterogeneous Networks," Beijing University of Posts and Telecommunications, Dissertation, Jan. 16, 2016, 80 pages (English abstract).

3GPP TS 23.501 V15.1.0 (Mar. 2018), "3rd Generation Partnership Project;Technical Specification Group Services and System Aspects-;System Architecture for the 5G System;Stage 2(Release 15)," 201 pages.

3GPP TS 23.502 V15.1.0 (Mar. 2018), "3rd Generation Partnership Project;Technical Specification Group Services and System Aspects;Procedures for the 5G System;Stage 2(Release 15)," Mar. 2018, 285 pages.

3GPP TS 38.300 V15.1.0 (Mar. 2018), "3rd Generation Partnership Project;Technical Specification Group Radio Access Network;NR; NR and NG-RAN Overall Description;Stage 2(Release 15)," Mar. 2018, 71 pages.

3GPP TS 38.413 V0.7.0 (Mar. 2018), "3rd Generation Partnership Project;Technical Specification Group Radio Access Network;NG-RAN;NG Application Protocol (NGAP)(Release 15)," Mar. 2018, 121 pages.

Huawei, Hisilicon, "UE DL Signalling handling in RRC Inactive State," 3GPP TSG-SA2 Meeting #127, S2-183330, Sanya, P.R. China, Apr. 16-20, 2018, 8 pages.

PCT International Search Report and Written Opinion issued in International Application No. PCT/CN2019/081548 dated Jul. 5, 2019, 13 pages (with English translation).

Office Action issued in Japanese Application No. 2020-551532 dated Jul. 12, 2022, 3 pages (with English translation).

* cited by examiner

ACTIVATING A PACKET DATA UNIT (PDU) SESSION USING DOWNLINK INFORMATION

CROSS-REFERENCE TO RELATED APPLICATIONS

This application is a continuation of International Application No. PCT/CN2019/081548, filed on Apr. 4, 2019, which claims priority to Chinese Patent Application No. 201810317648.X, filed on Apr. 10, 2018. The disclosures of the aforementioned applications are hereby incorporated by reference in their entireties.

TECHNICAL FIELD

This application relates to the field of communications technologies, and in particular, to a communication method and a communications apparatus.

BACKGROUND

In a fifth-generation (5G for short) wireless communications system, for a terminal whose radio resource control (RRC for short) connection mode is an inactive mode, when a status of the terminal that is stored in an access and mobility management function (AMF for short) is a connection management connected (CM-Connected) state, the AMF considers that location information in a context of the terminal stored in the AMF is current location information of the terminal. When no cell handover occurs on the terminal, if the terminal moves from a coverage area of a radio access network (RAN for short) 1 node (in a serving area of a user plane function (UPF for short) 1) to a coverage area of a RAN 2 node (not in the serving area of the UPF 1), the location information in the context of the terminal stored in the AMF is still information indicating that the terminal is located in the coverage area of the RAN 1 node. However, actually, the terminal has moved to the coverage area of the RAN 2 node. If a valid area of downlink information of the terminal is consistent with the serving area of the UPF 1, a result of determining, by the AMF based on the location information in the stored context of the terminal, that the terminal is located in the valid area of the downlink information is incorrect. In this case, if the AMF sends, to the RAN 1 node, the downlink information used to activate a PDU session, PDU session activation fails.

SUMMARY

Embodiments of this application provide a communication method and a communications apparatus, to resolve a problem that a PDU session of a terminal in an inactive mode fails to be activated.

According to a first aspect, a communication method is provided, where the method is applied to a scenario in which a terminal whose RRC connection mode is an inactive mode moves from a coverage area of a first RAN node to a coverage area of a second RAN node, and the method includes: sending, by a first core network device, first downlink information to the first RAN node; receiving, by the first core network device, indication information from the first RAN node; and sending, by the first core network device, second downlink information to the second RAN node based on the indication information. The indication information may be used to indicate that the first RAN node fails in processing the first downlink information. When the first RAN node cannot process the first downlink information because the terminal moves from the coverage area of the first RAN node to the coverage area of the second RAN node, in the method, the first core network device receives the indication information that is sent by the first RAN node after the first RAN node fails in processing the first downlink information, and sends the second downlink information to the second RAN node based on the indication information, so that the second downlink information can be successfully processed by the second RAN node. For example, the second RAN node is a RAN node currently serving the terminal, and therefore can successfully process the second downlink information.

With reference to the first aspect, in a first possible implementation of the first aspect, the first downlink information is used by the first RAN node to activate a PDU session of the terminal, the PDU session is in an inactive state, the indication information is used to indicate that the PDU session fails to be activated, and the second downlink information is used by the second RAN node to activate the PDU session. In this case, the first core network device sends the second downlink information to the second RAN node, so that the second RAN node activates the PDU session of the terminal based on the second downlink information. Because the second RAN node is a RAN node currently serving the terminal, the second RAN node can successfully activate the PDU session of the terminal.

With reference to the first aspect, in a second possible implementation of the first aspect, the first downlink information is used by the first RAN node to deactivate a PDU session of the terminal, the PDU session is in an active state, the indication information is used to indicate that the PDU session fails to be deactivated, and the second downlink information is used by the second RAN node to deactivate the PDU session. In this case, the first core network device sends the second downlink information to the second RAN node, so that the second RAN node deactivates the PDU session of the terminal based on the second downlink information. Because the second RAN node is a RAN node currently serving the terminal, the second RAN node can successfully deactivate the PDU session of the terminal.

With reference to the first aspect, in a third possible implementation of the first aspect, the first downlink information is used by the first RAN node to update a PDU session of the terminal, the PDU session is in an active state, the indication information is used to indicate that the PDU session fails to be updated, and the second downlink information is used by the second RAN node to update the PDU session. In this case, the first core network device sends the second downlink information to the second RAN node, so that the second RAN node modifies the PDU session of the terminal based on the second downlink information. Because the second RAN node is a RAN node currently serving the terminal, the second RAN node can successfully modify the PDU session of the terminal.

With reference to the first aspect, in a fourth possible implementation of the first aspect, the first downlink information is used by the first RAN node to release a PDU session of the terminal, the PDU session is in an active state, the indication information is used to indicate that the PDU session fails to be released, and the second downlink information is used by the second RAN node to release the PDU session. In this case, the first core network device sends the second downlink information to the second RAN node, so that the second RAN node releases the PDU session of the terminal based on the second downlink information. Because the second RAN node is a RAN node currently serving the terminal, the second RAN node can successfully release the PDU session of the terminal.

With reference to the first aspect, in a fifth possible implementation of the first aspect, the first downlink information is downlink information to be sent to the terminal, the indication information is used to indicate that the first downlink information fails to be transmitted, and the second downlink information is the same as the first downlink information. In this case, the first core network device identifies, based on the indication information, that the first downlink information fails to be transmitted, and sends the second downlink information to the second RAN node.

With reference to the first possible implementation of the first aspect, in a sixth possible implementation of the first aspect, the method further includes: generating, by the first core network device, the second downlink information based on current location information of the terminal when the first core network device determines, based on the current location information of the terminal, that the terminal is not located in a valid area of the first downlink information. The first downlink information may be valid for a device in the valid area of the first downlink information. In this case, the first core network device generates, for the terminal, the valid second downlink information corresponding to the current location information of the terminal. Because the current location information of the terminal is location information of the second RAN node, the second downlink information is valid for the second RAN node and can be successfully processed by the second RAN node. Therefore, a processing failure caused by sending the invalid first downlink information to the second RAN node is avoided.

With reference to the first possible implementation of the first aspect, in a seventh possible implementation of the first aspect, when the first core network device determines, based on current location information of the terminal, that the terminal is located in a valid area of the first downlink information, the first downlink information and the second downlink information are the same. The first downlink information may be valid for a device in the valid area of the first downlink information.

With reference to the first aspect or any possible implementation of the first aspect, in an eighth possible implementation of the first aspect, the method further includes: receiving, by the first core network device, the current location information of the terminal from the first RAN node. In this case, the first core network device obtains the current location information of the terminal, to determine whether to generate the second downlink information different from the first downlink information needs to be generated for the terminal.

With reference to the first aspect or any possible implementation of the first aspect, in a ninth possible implementation of the first aspect, the indication information is a failure cause value.

With reference to the ninth possible implementation of the first aspect, in a tenth possible implementation of the first aspect, the failure cause value includes: the terminal initiates an RRC connection resume procedure to another RAN node different from the first RAN node; the terminal is performing a handover; context transfer; the terminal is unreachable at the first RAN node; or the first downlink information is not transmitted. In this case, the first core network device learns of a cause of a failure in processing the first downlink information by the first RAN node.

With reference to the tenth possible implementation of the first aspect, in an eleventh possible implementation of the first aspect, the failure cause value includes: the terminal initiates an RRC connection resume procedure to another RAN node different from the first RAN node. The sending, by the first core network device, second downlink information to the second RAN node based on the indication information includes: sending, by the first core network device, the second downlink information to the second RAN node based on the indication information after the RRC connection resume procedure is completed. In this case, the first core network device sends the second downlink information to the second RAN node after the RRC connection resume procedure is completed, so that the second RAN node can successfully process the second downlink information.

With reference to the tenth possible implementation of the first aspect, in a twelfth possible implementation of the first aspect, the sending, by the first core network device, second downlink information to the second RAN node based on the indication information includes starting, by the first core network device, a timer based on the indication information, and sending the second downlink information to the second RAN node after the timer expires. In this case, the first core network device sends the second downlink information to the second RAN node after the timer expires, so that the second RAN node can successfully process the second downlink information.

With reference to the eleventh or the twelfth possible implementation of the first aspect, in a thirteenth possible implementation of the first aspect, the method further includes: sending, by the first core network device, a subscription request message to a second core network device, where the subscription request message is used to request the second core network device to send a notification message to the first core network device after the RRC connection resume procedure is completed, and the notification message is used to notify that the RRC connection resume procedure is completed. In this case, the first core network device can send the second downlink information to the second RAN node only after learning that the RRC connection resume procedure is completed, so that the second RAN node can successfully process the second downlink information.

With reference to the eleventh possible implementation of the first aspect, in a fourteenth possible implementation of the first aspect, the method further includes: starting, by the first core network device, a timer based on the indication information; and sending, by the first core network device, the second downlink information to the second RAN node after the timer expires. The timer may be used to complete the RRC connection resume procedure. For example, when the timer expires, it indicates that the RRC connection resume procedure is completed. In this case, the first core network device sends the second downlink information to the second RAN node after the timer expires, so that the second RAN node can successfully process the second downlink information.

With reference to the tenth possible implementation of the first aspect, in a fifteenth possible implementation of the first aspect, the failure cause value includes: the terminal initiates an RRC connection resume procedure to another RAN node different from the first RAN node. The sending, by the first core network device, second downlink information to the second RAN node based on the indication information includes: sending, by the first core network device, the second downlink information to the second RAN node based on the indication information after path switching in the RRC connection resume procedure is completed. In this case, the first core network device can send the second downlink information to the second RAN node only after the path switching in the RRC connection resume procedure is completed, so that the second RAN node can successfully process the second downlink information.

With reference to the fourteenth possible implementation of the first aspect, in a sixteenth possible implementation of the first aspect, the method further includes: sending, by the first core network device, a subscription request message to a second core network device, where the subscription request message is used to request the second core network device to send a notification message to the first core network device after path switching in the RRC connection resume procedure is completed, and the notification message is used to notify that the path switching is completed. In this case, the first core network device can send the second downlink information to the second RAN node only after learning that the path switching in the RRC connection resume procedure is completed, so that the second RAN node can successfully process the second downlink information.

According to a second aspect, a communication method is provided, where the method is applied to a scenario in which a terminal moves from a coverage area of a first RAN node to a coverage area of a second RAN node, and the method includes: receiving, by the first RAN node, first downlink information of the terminal from a first core network device; paging, by the first RAN node, the terminal based on the first downlink information when an RRC connection mode of the terminal is an inactive mode; receiving, by the first RAN node, a context request of the terminal from the second RAN node; and sending, by the first RAN node, indication information to the first core network device based on the context request. The indication information may be used to indicate that the first RAN node fails in processing the first downlink information. When the first RAN node cannot process the first downlink information because the terminal moves from the coverage area of the first RAN node to the coverage area of the second RAN node, in the method, the first RAN node sends the indication information to the first core network device, so that the first core network device can learn that the first downlink information is unsuccessfully processed by the first RAN node.

With reference to the second aspect, in a first possible implementation of the second aspect, the first downlink information is used to activate a PDU session of the terminal, the PDU session is in an inactive state, and the indication information is used to indicate that the PDU session fails to be activated. In this case, when the first RAN node cannot activate the PDU session because the terminal moves from the coverage area of the first RAN node to the coverage area of the second RAN node, the first core network device learns, based on the indication information, that the PDU session fails to be activated.

With reference to the second aspect, in a second possible implementation of the second aspect, the first downlink information is used to deactivate a PDU session of the terminal, the PDU session is in an active state, and the indication information is used to indicate that the PDU session fails to be deactivated. In this case, when the first RAN node cannot deactivate the PDU session because the terminal moves from the coverage area of the first RAN node to the coverage area of the second RAN node, the first core network device learns, based on the indication information, that the PDU session fails to be deactivated.

With reference to the second aspect, in a third possible implementation of the second aspect, the first downlink information is used to update a PDU session of the terminal, the PDU session is in an active state, and the indication information is used to indicate that the PDU session fails to be updated. In this case, when the first RAN node cannot modify the PDU session because the terminal moves from the coverage area of the first RAN node to the coverage area of the second RAN node, the first core network device learns, based on the indication information, that the PDU session fails to be modified.

With reference to the second aspect, in a fourth possible implementation of the second aspect, the first downlink information is used to release a PDU session of the terminal, the PDU session is in an active state, and the indication information is used to indicate that the PDU session fails to be released. In this case, when the first RAN node cannot release the PDU session because the terminal moves from the coverage area of the first RAN node to the coverage area of the second RAN node, the first core network device learns, based on the indication information, that the PDU session fails to be released.

With reference to the second aspect, in a fifth possible implementation of the second aspect, the first downlink information is downlink information to be sent to the terminal, and the indication information is used to indicate that the first downlink information fails to be transmitted. When the first RAN node cannot send the first downlink information of the terminal to the terminal because the terminal moves from the coverage area of the first RAN node to the coverage area of the second RAN node, the first core network device learns, based on the indication information, that the first downlink information is unsuccessfully sent to the terminal.

With reference to the second aspect or any possible implementation of the second aspect, in a sixth possible implementation of the second aspect, the indication information is a failure cause value. In this case, the first core network device learns of a cause of a failure in processing the first downlink information by the first RAN node.

With reference to the sixth possible implementation of the second aspect, in a seventh possible implementation of the second aspect, the failure cause value includes; the terminal initiates an RRC connection resume procedure to another RAN node different from the first RAN node; the terminal is performing a handover; context transfer; the terminal is unreachable at the first RAN node; or the first downlink information is not transmitted. In this case, the first core network device learns of a cause of a failure in processing the first downlink information by the first RAN node.

With reference to the second aspect or any possible implementation of the second aspect, in an eighth possible implementation of the second aspect, the method further includes: sending, by the first RAN node, current location information of the terminal to the first core network device. In this way, the first core network device obtains the current location information of the terminal, to determine whether the terminal is located in a valid area of the first downlink information. The first downlink information may be valid for a device in the valid area of the first downlink information.

According to a third aspect, a communication method is provided, where the method is applied to a scenario in which a terminal whose RRC connection mode is an inactive mode moves from a coverage area of a first RAN node to a coverage area of a second RAN node, and the method includes: receiving, by a second core network device, first downlink information from a first core network device, and sending the first downlink information to the first RAN node; receiving, by the second core network device, a first message from the first RAN node; and sending, by the second core network device, the first downlink information to the second RAN node based on the first message. The first message may be used to indicate that the first RAN node fails in processing the first downlink information. When the first RAN node cannot process the first downlink information because the terminal moves from the coverage area of the first RAN node to the coverage area of the second RAN node, in the method, the second core network device receives the first downlink information sent by the first core network device, and after receiving the first message that is sent by the first RAN node and that is used to indicate that the first RAN node fails in processing the first downlink information, the second core network device sends the first downlink information to the second RAN node, so that the first downlink information can be successfully processed by the second RAN node. For example, because the second RAN node is a RAN node currently serving the terminal, the second RAN node can successfully process the first downlink information.

With reference to the third aspect, in a first possible implementation of the third aspect, the first downlink information is used to activate a PDU session of the terminal, the PDU session is in an inactive state, and the first message is used to indicate that the PDU session fails to be activated. In this case, the second core network device sends the first downlink information to the second RAN node, so that the second RAN node activates the PDU session of the terminal based on the first downlink information. Because the second RAN node is a RAN node currently serving the terminal, the second RAN node can successfully activate the PDU session of the terminal.

With reference to the third aspect, in a second possible implementation of the third aspect, the first downlink information is used to deactivate a PDU session of the terminal, the PDU session is in an active state, and the first message is used to indicate that the PDU session fails to be deactivated. In this case, the second core network device sends the first downlink information to the second RAN node, so that the second RAN node deactivates the PDU session of the terminal based on the first downlink information. Because the second RAN node is a RAN node currently serving the terminal, the second RAN node can successfully deactivate the PDU session of the terminal.

With reference to the third aspect, in a third possible implementation of the third aspect, the first downlink information is used to update a PDU session of the terminal, the PDU session is in an active state, and the first message is used to indicate that the PDU session fails to be updated. In this case, the second core network device sends the first downlink information to the second RAN node, so that the second RAN node modifies the PDU session of the terminal based on the first downlink information. Because the second RAN node is a RAN node currently serving the terminal, the second RAN node can successfully modify the PDU session of the terminal.

With reference to the third aspect, in a fourth possible implementation of the third aspect, the first downlink information is used to release a PDU session of the terminal, the PDU session is in an active state, and the first message is used to indicate that the PDU session fails to be released. In this case, the second core network device sends the first downlink information to the second RAN node, so that the second RAN node releases the PDU session of the terminal based on the first downlink information. Because the second RAN node is a RAN node currently serving the terminal, the second RAN node can successfully release the PDU session of the terminal.

With reference to the third aspect, in a fifth possible implementation of the third aspect, the first downlink information is downlink information to be sent to the terminal, and the first message is used to indicate that the first downlink information fails to be transmitted. In this case, the second core network device sends the first downlink information to the second RAN node, so that the second RAN node sends the first downlink information to the terminal. Because the second RAN node is a RAN node currently serving the terminal, the second RAN node can successfully send the first downlink information to the terminal.

With reference to the third aspect or any possible implementation of the third aspect, in a sixth possible implementation of the third aspect, the sending, by the second core network device, the first downlink information to the second RAN node based on the first message includes: receiving, by the second core network device from the first core network device, information about a valid area of the first downlink information, where the first downlink information is valid for a device in the valid area of the first downlink information, and sending, by the second core network device, the first downlink information to the second RAN node based on the first message when the second core network device determines, based on current location information of the terminal and the information about the valid area of the first downlink information, that the terminal is located in the valid area. In this case, the second core network device determines that a current location of the terminal is in the valid area of the first downlink information, and determines to send the first downlink information to the second RAN node, so that the first downlink information can be successfully processed by the second RAN node. Therefore, a processing failure caused by sending the invalid first downlink information to the second RAN node is avoided.

With reference to the third aspect or any possible implementation of the third aspect, in a seventh possible implementation of the third aspect, the sending the first downlink information to the first RAN node includes: receiving, by the second core network device from the first core network device, information about a valid area of the first downlink information, where the first downlink information is valid for a device in the valid area of the first downlink information; and sending, by the second core network device, the first downlink information to the first RAN node when a status of the terminal in the second core network device is a connection management connected state and the second core network device determines, based on location information in a stored context of the terminal and the information about the valid area, that the terminal is located in the valid area. In this case, the second core network device determines that a location in the context of the terminal is in the valid area of the first downlink information, and determines to send the first downlink information to the first RAN node, so that the first downlink information can be successfully processed by the first RAN node. Therefore, a processing failure caused by sending the invalid first downlink information to the first RAN node is avoided.

With reference to the first possible implementation of the third aspect, in an eighth possible implementation of the third aspect, a message type or a message name of the first message is used to indicate that the PDU session fails to be activated; or the first message includes indication information, where the indication information is used to indicate that the PDU session fails to be activated. In this case, the second core network device learns that the first RAN node fails in activating the PDU session.

With reference to the second possible implementation of the third aspect, in a ninth possible implementation of the third aspect, a message type or a message name of the first message is used to indicate that the PDU session fails to be deactivated; or the first message includes indication information, where the indication information is used to indicate that the PDU session fails to be deactivated. In this case, the second core network device learns that the first RAN node fails in deactivating the PDU session.

With reference to the third possible implementation of the third aspect, in a tenth possible implementation of the third aspect, a message type or a message name of the first message is used to indicate that the PDU session fails to be updated; or the first message includes indication information, where the indication information is used to indicate that the PDU session fails to be updated. In this case, the second core network device learns that the first RAN node fails in modifying the PDU session.

With reference to the fourth possible implementation of the third aspect, in an eleventh possible implementation of the third aspect, a message type or a message name of the first message is used to indicate that the PDU session fails to be released; or the first message includes indication information, where the indication information is used to indicate that the PDU session fails to be released. In this case, the second core network device learns that the first RAN node fails in releasing the PDU session.

With reference to the fifth possible implementation of the third aspect, in a twelfth possible implementation of the third aspect, a message type or a message name of the first message is used to indicate that the first downlink information fails to be transmitted; or the first message includes indication information, where the indication information is used to indicate that the first downlink information fails to be transmitted. In this case, the second core network device learns that the first RAN node fails in transmitting the first downlink information.

With reference to the third aspect or any possible implementation of the third aspect, in a thirteenth possible implementation of the third aspect, the indication information is a failure cause value. In this case, the second core network device learns of a cause of a failure in processing the first downlink information by the first RAN node.

With reference to the thirteenth possible implementation of the third aspect, in a fourteenth possible implementation of the third aspect, the failure cause value includes: the terminal initiates an RRC connection resume procedure to another RAN node different from the first RAN node; the terminal is performing a handover; context transfer; the terminal is unreachable at the first RAN node; or the first downlink information is not transmitted. In this case, the second core network device learns of a cause of a failure in processing the first downlink information by the first RAN node.

With reference to the fourteenth possible implementation of the third aspect, in a fifteenth possible implementation of the third aspect, the failure cause value includes: the terminal initiates an RRC connection resume procedure to another RAN node different from the first RAN node. The sending, by the second core network device, the first downlink information to the second RAN node based on the first message includes:

sending, by the second core network device, the first downlink information to the second RAN node based on the first message after the RRC connection is resumed; or sending, by the second core network device, the first downlink information to the second RAN node based on the first message after path switching in the RRC connection resume procedure is completed. In this case, the second core network device can send the first downlink information to the second RAN node only after learning that the RRC connection resume procedure is completed or learning that the path switching in the RRC connection resume procedure is completed, so that the second RAN node can successfully process the first downlink information.

With reference to the third aspect or any possible implementation of the third aspect, in a sixteenth possible implementation of the third aspect, the method further includes: receiving, by the second core network device, the current location information of the terminal from the first RAN node. In this case, the second core network device learns of the current location information of the terminal, to determine that the current location of the terminal is in the valid area of the first downlink information, and determine to send the first downlink information to the second RAN node, so that the first downlink information can be successfully processed by the second RAN node. Therefore, a processing failure caused by sending the invalid first downlink information to the second RAN node is avoided.

According to a fourth aspect, a communication method is provided, where the method is applied to a scenario in which a terminal whose RRC connection mode is an inactive mode moves from a coverage area of a first RAN node to a coverage area of a second RAN node, and the method includes: receiving, by a second core network device, first downlink information from a first core network device, and sending the first downlink information to the first RAN node; receiving, by the second core network device, a first message from the first RAN node; and sending, by the second core network device, indication information to the first core network device based on the first message. The first message may be used to indicate that the first RAN node fails in processing the first downlink information. When the first RAN node cannot process the first downlink information because the terminal moves from the coverage area of the first RAN node to the coverage area of the second RAN node, in the method, the first RAN node sends the first message to the second core network device, and the second core network device sends the indication information to the first core network device, so that the first core network device learns that the first downlink information fails to be processed.

With reference to the fourth aspect, in a first possible implementation of the fourth aspect, the first downlink information is used to activate a PDU session of the terminal, the PDU session is in an inactive state, and the first message is used to indicate that the PDU session fails to be activated. In this case, the second core network device sends the indication information to the first core network device, so that the first core network device learns that the PDU session fails to be activated.

With reference to the fourth aspect, in a second possible implementation of the fourth aspect, the first downlink information is used to deactivate a PDU session of the terminal, the PDU session is in an active state, and the first message is used to indicate that the PDU session fails to be deactivated. In this case, the second core network device sends the indication information to the first core network device, so that the first core network device learns that the PDU session fails to be deactivated.

With reference to the fourth aspect, in a third possible implementation of the fourth aspect, the first downlink information is used to update a PDU session of the terminal, the PDU session is in an active state, and the first message is used to indicate that the PDU session fails to be updated. In this case, the second core network device sends the indication information to the first core network device, so that the first core network device learns that the PDU session fails to be modified.

With reference to the fourth aspect, in a fourth possible implementation of the fourth aspect, the first downlink information is used to release a PDU session of the terminal, the PDU session is in an active or inactive state, and the first message is used to indicate that the PDU session fails to be released. In this case, the second core network device sends the indication information to the first core network device, so that the first core network device learns that the PDU session fails to be released.

With reference to the fourth aspect, in a fifth possible implementation of the fourth aspect, the first downlink information is downlink information to be sent to the terminal, and the first message is used to indicate that the first downlink information fails to be transmitted. In this case, the second core network device sends the indication information to the first core network device, so that the first core network device learns that the first downlink information fails to be transmitted.

With reference to the fourth aspect or any possible implementation of the fourth aspect, in a sixth possible implementation of the fourth aspect, the sending, by the second core network device, indication information to the first core network device based on the first message includes: receiving, by the second core network device from the first core network device, information about a valid area of the first downlink information, where the first downlink information is valid for a device in the valid area of the first downlink information; and sending, by the second core network device, the indication information to the first core network device based on the first message when the second core network device determines, based on current location information of the terminal and the information about the valid area of the first downlink information, that the terminal is not located in the valid area. In this case, the second core network device determines that a current location of the terminal is not in the valid area of the first downlink information, and determines to send the indication information to the first core network device, so that the first core network device generates second downlink information that is valid for the current location of the terminal. In addition, a processing failure caused because the second core network device sends the invalid first downlink information to the second RAN node is avoided.

With reference to the fourth aspect or any possible implementation of the fourth aspect, in a seventh possible implementation of the fourth aspect, the sending the first downlink information to the first RAN node includes: receiving, by the second core network device from the first core network device, information about a valid area of the first downlink information, where the first downlink information is valid for a device in the valid area of the first downlink information; and sending, by the second core network device, the first downlink information to the first RAN node when a status of the terminal in the second core network device is a connection management connected state and the second core network device determines, based on location information in a stored context of the terminal and the information about the valid area, that the terminal is located in the valid area. In this case, the second core network device determines that a location in the context of the terminal is in the valid area of the first downlink information, and determines to send the first downlink information to the first RAN node, so that the first downlink information can be successfully processed by the first RAN node. Therefore, a processing failure caused by sending the invalid first downlink information to the first RAN node is avoided.

With reference to the first possible implementation of the fourth aspect, in an eighth possible implementation of the fourth aspect, a message type or a message name of the first message is used to indicate that the PDU session fails to be activated; or the first message includes indication information, where the indication information is used to indicate that the PDU session fails to be activated. In this case, the second core network device learns that the first RAN node fails in activating the PDU session.

With reference to the second possible implementation of the fourth aspect, in a ninth possible implementation of the fourth aspect, a message type or a message name of the first message is used to indicate that the PDU session fails to be deactivated; or the first message includes indication information, where the indication information is used to indicate that the PDU session fails to be deactivated. In this case, the second core network device learns that the first RAN node fails in deactivating the PDU session.

With reference to the third possible implementation of the fourth aspect, in a tenth possible implementation of the fourth aspect, a message type or a message name of the first message is used to indicate that the PDU session fails to be updated; or the first message includes indication information, where the indication information is used to indicate that the PDU session fails to be updated. In this case, the second core network device learns that the first RAN node fails in modifying the PDU session.

With reference to the fourth possible implementation of the fourth aspect, in an eleventh possible implementation of the fourth aspect, a message type or a message name of the first message is used to indicate that the PDU session fails to be released: or the first message includes indication information, where the indication information is used to indicate that the PDU session fails to be released. In this case, the second core network device learns that the first RAN node fails in releasing the PDU session.

With reference to the fifth possible implementation of the fourth aspect, in a twelfth possible implementation of the fourth aspect, a message type or a message name of the first message is used to indicate that the first downlink information fails to be transmitted; or the first message includes indication information, where the indication information is used to indicate that the first downlink information fails to be transmitted. In this case, the second core network device learns that the first RAN node fails in transmitting the first downlink information.

With reference to any one of the eighth to the twelfth possible implementations of the fourth aspect, in a thirteenth possible implementation of the fourth aspect, the indication information is a failure cause value. In this case, the second core network device learns of a cause of a failure in processing the first downlink information by the first RAN node.

With reference to the thirteenth possible implementation of the fourth aspect, in a fourteenth possible implementation of the fourth aspect, the failure cause value includes: the terminal initiates an RRC connection resume procedure to another RAN node different from the first RAN node; the terminal is performing a handover; context transfer; the terminal is unreachable at the first RAN node; or the first downlink information is not transmitted. In this case, the second core network device learns of a cause of a failure in processing the first downlink information by the first RAN node.

With reference to the fourth aspect or any possible implementation of the fourth aspect, in a fifteenth possible implementation of the fourth aspect, the method further includes: receiving, by the second core network device, the current location information of the terminal from the first RAN node. In this case, the second core network device learns of the current location information of the terminal, to determine that a current location of the terminal is not in the valid area of the first downlink information, and determine to send the indication information to the first core network device, so that the first core network device generates second downlink information that is valid for the current location of the terminal. In addition, a processing failure caused because the second core network device sends the invalid first downlink information to the second RAN node is avoided.

According to a fifth aspect, a communication method is provided, where the method is applied to a scenario in which a terminal whose RRC connection mode is an inactive mode moves from a coverage area of a first RAN node to a coverage area of a second RAN node, and the method includes: obtaining, by a second core network device, first downlink information; sending, by the second core network device, a location request message to the first RAN node, where the location request message is used to request current location information of the terminal; receiving, by the second core network device, the current location information of the terminal from the first RAN node, and/or receiving, by the second core network device from the first RAN node, indication information indicating that the terminal initiates an RRC connection resume procedure to another RAN node different from the first RAN node; and sending, by the second core network device, the first downlink information to the second RAN node; or sending, by the second core network device, the indication information to the first core network device. When the first RAN node cannot process the first downlink information because the terminal moves from the coverage area of the first RAN node to the coverage area of the second RAN node, in the method, the second core network device receives information or a message from the first RAN node, and the second core network device is triggered to send the first downlink information to the second RAN node, so that the first downlink information can be successfully processed by the second RAN node. Alternatively, the second core network device is triggered to send the indication information to the first core network device, so that the first core network device learns that the first downlink information fails to be processed.

According to a sixth aspect, a communication method is provided, where the method is applied to a scenario in which a terminal moves from a coverage area of a first RAN node to a coverage area of a second RAN node, and the method includes: receiving, by the first RAN node, a location request message from a second core network device, where the location request message is used to request current location information of the terminal; paging, by the first RAN node, the terminal based on the location request message when an RRC connection mode of the terminal is an inactive mode; receiving, by the first RAN node, a context request of the terminal from the second RAN node; and sending, by the first RAN node to the second core network device based on the context request, indication information indicating that the terminal initiates an RRC connection resume procedure to another RAN node different from the first RAN node, and/or the current location information of the terminal. When the first RAN node cannot process the first downlink information because the terminal moves from the coverage area of the first RAN node to the coverage area of the second RAN node, in the method, the first RAN node sends information or a message to the second core network device, so that the second core network device learns that the first downlink information is unsuccessfully processed by the first RAN node.

According to a seventh aspect, a communications apparatus is provided. The apparatus has functions of implementing any method according to the first aspect to the sixth aspect. The functions may be implemented by hardware, or by hardware executing corresponding software. The hardware or the software includes one or more units corresponding to the foregoing functions. The apparatus may exist in a product form of a chip.

According to an eighth aspect, a communications apparatus is provided. The apparatus includes a memory, a processor, at least one communications interface, and a communications bus. The memory is configured to store a computer-executable instruction. The processor, the memory, and the at least one communications interface are connected via the communications bus. The processor executes the computer-executable instruction stored in the memory, so that the apparatus implements the method according to any one of the first aspect to the sixth aspect. The apparatus may exist in a product form of a chip.

According to a ninth aspect, a computer-readable storage medium is provided. The computer-readable storage medium includes an instruction, and when the instruction is run on a computer, the computer is enabled to perform the method according to any one of the first aspect to the sixth aspect.

According to a tenth aspect, a computer program product including an instruction is provided. When the computer program product runs on a computer, the computer is enabled to perform the method according to any one of the first aspect to the sixth aspect.

For technical effects brought by any design in the seventh aspect to the tenth aspect, refer to technical effects brought by different designs in the first aspect to the sixth aspect. Details are not described herein again.

DESCRIPTION OF EMBODIMENTS

Figure 1:
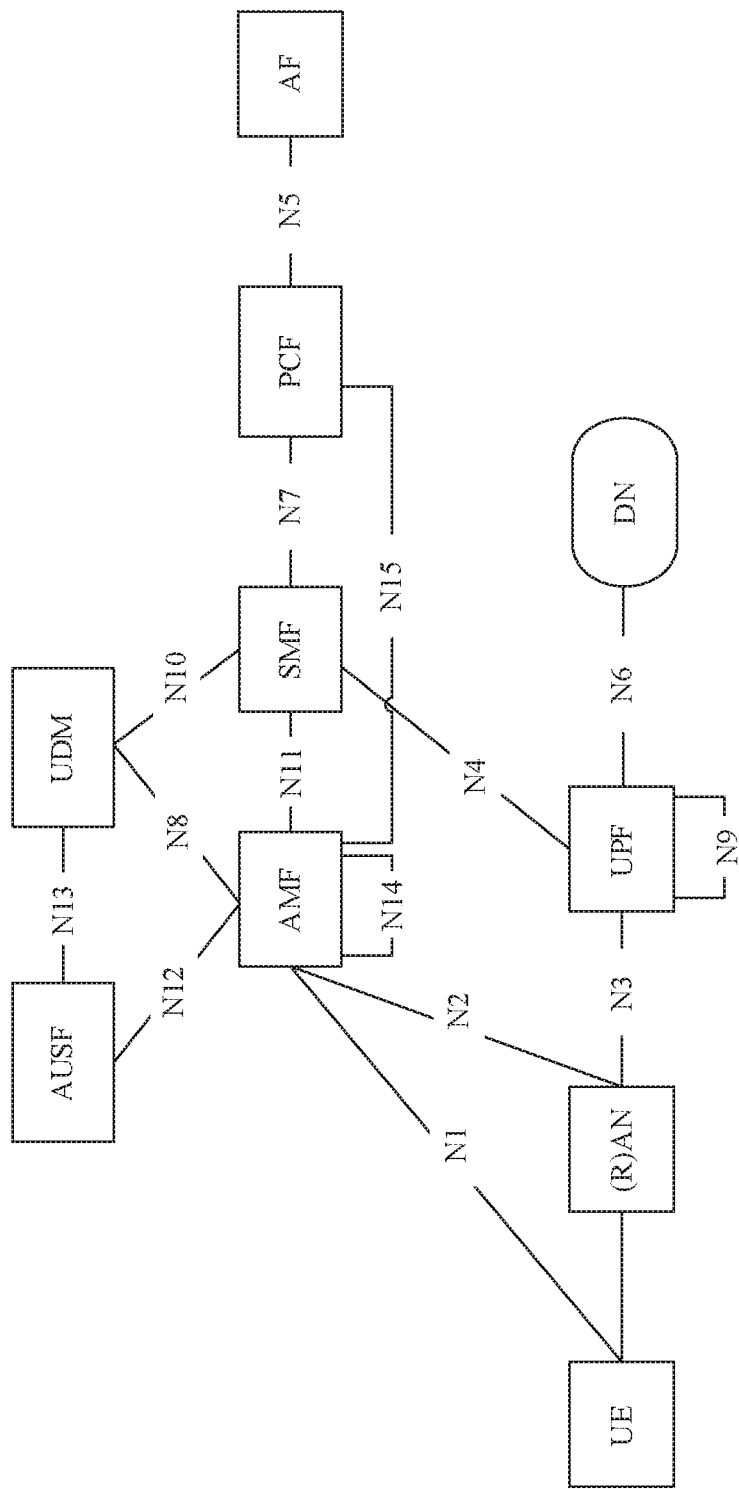
FIG. 1 is a schematic diagram of an architecture of a 5G network according to an embodiment of this application.

The following describes the technical solutions in the embodiments of this application with reference to the accompanying drawings in the embodiments of this application. In the descriptions of this application, "/" means "or" unless otherwise specified. For example, A/B may represent A or B. The term "and/or" in this specification describes only an association relationship for associated objects and represents that three relationships may exist. For example, A and/or B may represent the following three cases: Only A exists, both A and B exist, and only B exists. In addition, in the descriptions of this application, "a plurality of" means two or more than two. In addition, to clearly describe the technical solutions in the embodiments of this application, terms such as "first" and "second" are used in the embodiments of this application to distinguish between same items or similar items that have basically same functions and purposes. A person skilled in the art may understand that the terms such as "first" and "second" do not limit a quantity or an execution sequence, and that the terms such as "first" and "second" do not indicate a definite difference.

The technical solutions in the embodiments of this application may be applied to various communications systems for data processing, such as code division multiple access (CDMA for short), time division multiple access (TDMA for short), frequency division multiple access (FDMA for short), orthogonal frequency division multiple access (OFDMA for short), single carrier frequency division multiple access (SC-FDMA for short), and another system. The terms "system" and "network" can be interchanged with each other. The CDMA system can implement radio technologies such as universal terrestrial radio access (UTRA) and CDMA 2000. UTRA may include a wideband CDMA (WCDMA for short) technology and another technology transformed from CDMA. CDMA 2000 may cover interim standard (IS for short) 2000 (IS-2000), IS-95, and IS-856. The TDMA system can implement wireless technologies such as global system for mobile communications (GSM for short). The OFDMA system can implement wireless technologies such as evolved universal terrestrial radio access (E-UTRA for short), ultra mobile broadband (UMB for short), IEEE 802.11 (Wi-Fi), IEEE 802.16 (WiMAX), IEEE 802.20, and Flash OFDMA. UTRA corresponds to UMTS, and E-UTRA corresponds to an evolved version of UMTS. A new version of UMTS, namely, E-UTRA, is used in 3GPP long term evolution (LTE) and various versions evolved based on LTE. A 5G communications system and a new radio (NR for short) communications system are next-generation communications systems under research. In addition, the communications systems may be further applicable to a future-oriented communications technology, and are all applicable to the technical solutions provided in the embodiments of this application.

The system architecture described in the embodiments of this application is intended to describe the technical solutions in the embodiments of this application more clearly, but are not intended to limit the technical solutions provided in the embodiments of this application. Persons of ordinary skill in the art may learn that with evolution of network architectures and emergence of a new service scenario, the technical solutions provided in the embodiments of this application are also applicable to a similar technical problem. In the embodiments of this application, an example in which the provided method is applied to the NR system or the 5G network is used for description. However, it should be noted that the method provided in the embodiments of the application may also be applied to another network, for example, may be applied to an evolved packet system (EPS for short) network (that is, a 4th generation (4G for short) network generally mentioned). Correspondingly, when the method provided in the embodiments of this application is applied to the EPS network, a network node that performs the method provided in the embodiments of this application is replaced with a network node that has a same or corresponding function in the EPS network.

For example, the method provided in the embodiments of this application may be applied to a 5G network. Referring to FIG. 1, the 5G network may include the following plurality of network function (NF for short) entities: an authentication server function (AUSF for short) entity, an AMF entity, a data network (DN for short), a unified data management (UDM for short) entity, a policy control function (PCF for short) entity, a (radio) access network ((R)AN for short) entity, a UPF entity, user equipment (UE for short), an application function (AF for short) entity, a session management function (SMF) entity, or the like.

It may be understood that FIG. 1 is merely an example of an architectural diagram. In addition to the function entities shown in FIG. 1, an architecture of the 5G network may further include another function entity. For example, a network exposure function (NEF) entity may be further included between the AF entity and the PCF entity. The entity may also be referred to as a network element, a device, or the like.

The UDM entity, the AUSF entity, the PCF entity, the AMF entity, and the SMF entity in FIG. 1 may also be collectively referred to as a control plane function (CPF) entity. This is not specifically limited in the embodiments of this application.

Specifically, the (R)AN is a network including a plurality of 5G-RAN nodes, and implements a radio physical layer function, resource scheduling and radio resource management, radio access control, and a mobility management function. The 5G-RAN node is connected to the UPF through a user plane interface N3, and is configured to transmit data of a terminal. The 5G-RAN node establishes a control plane signaling connection to the AMF through a control plane interface N2 to implement functions such as radio access bearer control. The AMF is mainly responsible for functions such as terminal authentication, mobility management of the terminal, network slice selection, and SMF selection. The AMF serves as an anchor for N1 and N2 signaling connections, provides the SMF with routing of a session management (SM for short) message through an N1/N2 interface, and maintains and manages status information of the terminal. The SMF is mainly responsible for all control plane functions in terminal session management, where the control plane functions include UPF selection, internet protocol (IP for short) address assignment, quality of service (QoS for short) management of a session, obtaining a policy and charging control (PCC for short) policy from the PCF, and the like. As an anchor of a packet data unit (PDU for short) session connection, the UPF is responsible for data packet filtering, data transmission/forwarding, rate control, charging information generation, and the like for the terminal.

It should be noted that the (R)AN entity, the AMF entity, the SMF entity, the AUSF entity, the UDM entity, the UPF entity, the PCF entity, and the like in FIG. 1 are merely names, and the names constitute no limitation on devices. In the 5G network and other future networks, network elements or devices corresponding to these entities may also have other names. This is not specifically limited in the embodiments of this application. For example, the UDM entity may alternatively be replaced with a home subscriber server (HSS for short), a user subscription database (USD for short), a database entity, or the like. The description is provided herein, and is not provided below again.

The method provided in the embodiments of this application may be further applied to a network slice of the 5G network. A network slice technology is used to slice one physical network into a plurality of virtual end-to-end networks. Each virtual network, including a device, an access technology, a transmission path, and a core network in the network, is logically independent. Network slices each include a separate network function or are obtained by instantiating a combination of functions, have different function features, and are oriented towards different requirements and services. The network slices are isolated so that different users or user groups can flexibly and dynamically define and customize network capabilities based on different application scenarios and requirements of the users or user groups, without affecting each other.

A network slice includes a CPF entity and a UPF entity. The CPF entity mainly implements access control and mobility management functions such as access authentication, security encryption, and location registration of the terminal, and session management functions such as establishment, release, and change of a user plane transmission path. The UPF entity mainly implements functions such as user plane data routing and forwarding.

Optionally, the terminal in the embodiments of this application may also be referred to as UE (the terminal and the UE mentioned below are a same device). Specifically, the terminal may include various handheld devices, vehicle-mounted devices, wearable devices, or computing devices that have a wireless communication function, or other processing devices connected to a wireless modem. The terminal may further include a subscriber unit, a cellular phone, a smartphone, a wireless data card, a personal digital assistant (PDA for short) computer, a tablet computer, a wireless modem, a handheld device (handheld), a laptop computer, a cordless phone, a wireless local loop (WLL for short) station, a machine type communication (MTC for short) terminal, a mobile station (MS for short), a terminal device, and the like.

For ease of understanding of the technical solutions in the embodiments of this application, brief descriptions of related content in this application are first provided.

PDU session: One or more service flow templates of a PDU session are stored in the UPF, and the PDU session is used to carry downlink data that matches the service flow templates of the PDU session.

To be specific, after receiving the downlink data, the UPF matches the downlink data with a service flow template, and a PDU session corresponding to a service flow template that successfully matches the downlink data is a PDU session (assumed to be a PDU session 1) that carries the downlink data. If the UPF determines that the PDU session 1 has not been activated, the UPF needs to activate the PDU session 1 to send the downlink data. Referring to Table 1, in this case, even if a PDU session 2 and a PDU session 3 have been activated, because service flow templates corresponding to the PDU session 2 and the PDU session 3 do not match the downlink data, the UPF cannot use the PDU session 2 or the PDU session 3 to carry the downlink data.

One PDU session is served by only one SMF, and SMFs serving different PDU sessions may be the same or may be different. For example, referring to Table 1, the PDU session 1 is served by an SMF 1, and the PDU session 2 and the PDU session 3 are served by an SMF 2.

TABLE 1

| PDU session | Service flow template for the PDU session | SMF serving the PDU session |
| --- | --- | --- |
| 1 | 1 | 1 |
| 2 | 2 | 2 |
| 3 | 3 | |

Serving area of the UPF: The UPF provides a service for a RAN node in the serving area of the UPF (in other words, the UPF provides a service for UE in the serving area of the UPF, or the UPF provides a service for UE that is connected to a RAN node in the serving area of the UPF). A RAN node located in a serving area of a UPF may establish a data channel to the UPF, to provide a service for a terminal.

Figure 2:
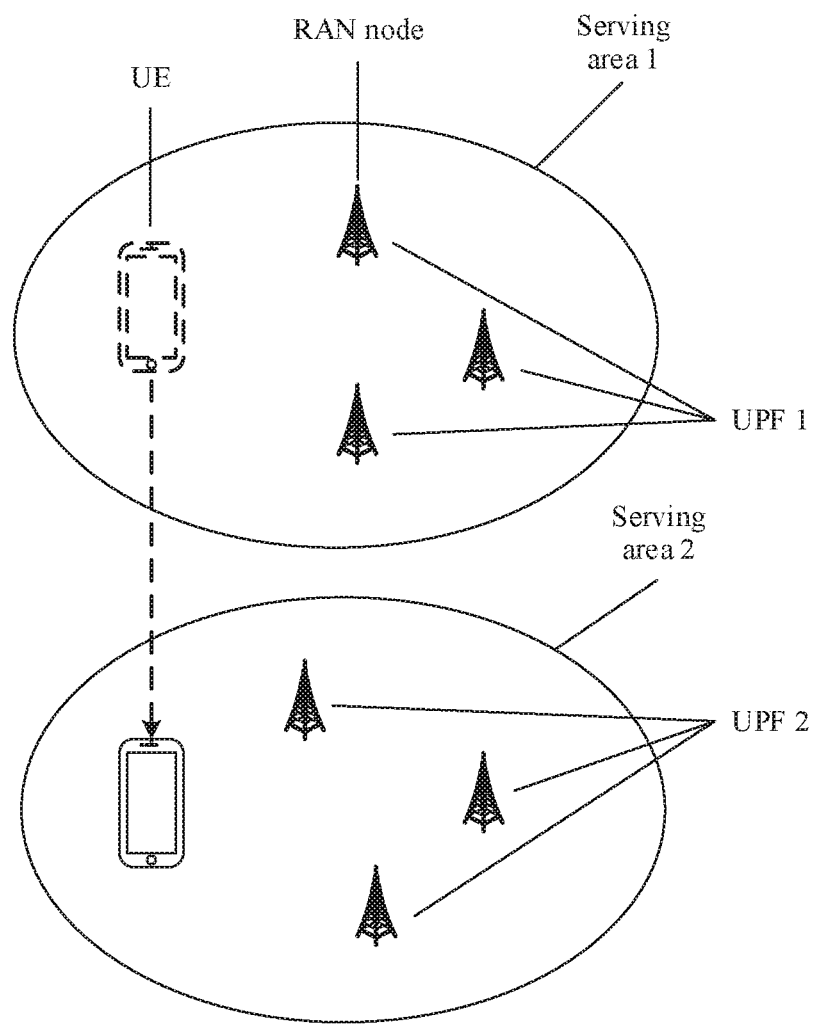
FIG. 2 is a schematic diagram of a serving area of a UPF according to an embodiment of this application.

As shown in FIG. 2, a UPF has a serving area (for example, in FIG. 2, a serving area of a UPF 1 is a serving area 1, and a serving area of a UPF 2 is a serving area 2). For example, when a terminal moves out of the serving area of the UPF 1, because a RAN node that is in the serving area of the UPF 1 and that serves the terminal cannot establish a data channel to the UPF 1, the UPF 1 cannot provide a service for the terminal. In this case, if the RAN node currently serving the terminal is a RAN 2 node, the SMF selects a UPF (denoted as a UPF 2) for the RAN 2 node, so that the RAN 2 node establishes a data channel to the UPF 2 to serve the terminal.

The AMF does not consider the serving area of the UPF when allocating a registration area (RA for short) to the terminal. When the terminal moves in the RA, the terminal may have moved out of the serving area of the UPF. In the 5G network, to obtain information about whether the terminal moves out of the serving area of the UPF 1, the SMF subscribes to "area of interest" (corresponding to the serving area 1 of the UPF 1) from the AMF. If the AMF determines that the terminal moves out of the serving area 1, the AMF notifies the information to the SMF, so that the SMF selects a UPF for the RAN 2 node.

In addition, in the prior art, after determining, based on the location information in the stored context of the terminal, that the terminal is located in the valid area of the downlink information, the AMF sends the downlink information to the RAN 1 node. Currently, there is no corresponding processing mechanism for how to process the downlink information after the RAN 1 node receives the downlink information in the prior art.

RRC connection mode: The RRC connection mode may include an idle mode, a connected mode, and an inactive mode.

That the RRC connection mode of the terminal is an idle mode may mean that no non-access stratum (NAS for short) signaling connection is established between the terminal and the AMF.

That the RRC connection mode of the terminal is a connected mode may mean that a NAS signaling connection has been established between the terminal and the AMF, and an RRC connection has been established between the terminal and the RAN.

That the RRC connection mode of the terminal is an inactive mode may mean that a NAS signaling connection has been established between the terminal and the AMF, but no RRC connection is established between the terminal and the RAN.

For a terminal in the connected mode or the inactive mode, a status of the terminal stored in the AMF is a connection management connected state. In addition, the AMF further stores a context of the terminal, where the context includes location information of the terminal, and the location information of the terminal is location information of the terminal that is reported in a process in which the terminal initially accesses a network (that is, a registration procedure or a service request procedure) or that is reported by a base station in a process in which the terminal performs cell handover. The location information of the terminal may be an identifier of a RAN node that serves the terminal, an evolved universal terrestrial radio access network (E-UTRAN for short) cell global identifier (ECGI for short) of a cell in which the terminal is located, or a TA identity (TAI for short) or a TA code (TAC for short) of a TA in which the terminal is located.

It should be noted that when the RRC connection mode of the terminal is the inactive mode, the AMF may also store a specific RRC connection mode (for example, the inactive mode) of the terminal.

In the 5G wireless communications system, for a terminal whose RRC connection mode is an inactive mode, if a status of the terminal stored in the AMF is a connection management connected state, the AMF considers that location information in a stored context of the terminal is current location information of the terminal. When no cell handover occurs on the terminal, if the terminal moves from a coverage area of the RAN 1 node (in the serving area of the UPF 1) to a coverage area of the RAN 2 node (not in the serving area of the UPF 1), the location information in the context of the terminal stored in the AMF is still information indicating that the terminal is located in the coverage area of the RAN 1 node. However, actually, the terminal has moved to the coverage area of the RAN 2 node. If a valid area of downlink information of the terminal is consistent with the serving area of the UPF, a result of determining, by the AMF based on the location information in the stored context of the terminal, that the terminal is located in the valid area of the downlink information is incorrect. In this case, if the AMF sends the downlink information of the terminal to the RAN 1 node, the downlink information fails to be processed.

Figure 3:
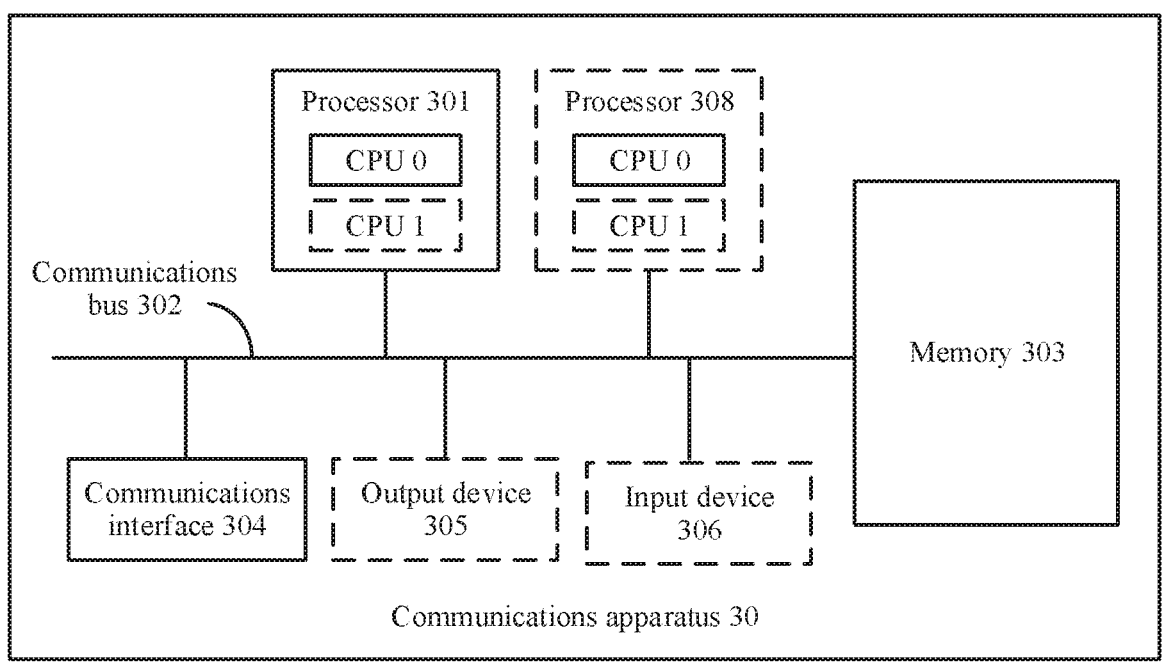
FIG. 3 is a schematic structural diagram of hardware of a communications apparatus according to an embodiment of this application.

To resolve this problem, an embodiment of this application provides a communications apparatus. FIG. 3 is a schematic structural diagram of hardware of a communications apparatus according to an embodiment of this application. The communications apparatus may be a first core network device, a second core network device, a first RAN node, or a second RAN node in the following content. The communications apparatus 30 includes at least one processor 301, a communications bus 302, a memory 303, and at least one communications interface 304.

The processor 301 may be one or more general-purpose central processors (CPU for short), microprocessors, or application-specific integrated circuits (ASIC for short), or one or more integrated circuits configured to control program execution of the solutions in this application.

The communications bus 302 is used for communication between the foregoing components, to transmit information.

The communications interface 304 is configured to communicate with another device or a communications network such as an Ethernet, a RAN device, or a wireless local area network (WLAN for short), and may use any apparatus such as a transceiver.

The memory 303 is configured to store a computer-executable instruction for executing the solutions in this application, and the processor 301 controls the execution of the computer-executable instruction. The processor 301 is configured to execute the computer-executable instruction stored in the memory 303, to implement the method provided in the following embodiments of this application. The memory 303 may be a read-only memory (ROM for short) or another type of static storage device that can store static information and instructions, a random access memory (RAM for short) or another type of dynamic storage device that can store information and instructions, or may be an electrically erasable programmable read-only memory (EEPROM for short), a compact disc read-only memory (CD-ROM for short) or another compact disc storage, optical disc storage (including a compressed optical disc, a laser disc, an optical disc, a digital versatile disc, a blue-ray optical disc, and the like), or magnetic disk storage medium or another magnetic storage device, or any other medium that can carry or store expected program code in a form of an instruction or a data structure and that can be accessed by a computer, but is not limited thereto. The memory 303 may exist independently and is connected to the processor 301 via the communications bus 302. The memory 303 may alternatively be integrated with the processor 301.

Optionally, the computer-executable instruction in this embodiment of this application may also be referred to as application program code. This is not specifically limited in this embodiment of this application.

In an embodiment, the processor 301 may include one or more CPUs, for example, a CPU 0 and a CPU 1 in FIG. 3.

In an embodiment, the communications apparatus 30 may include a plurality of processors, for example, the processor 301 and a processor 308 in FIG. 3. Each of the processors may be a single-core (single-CPU) processor, or may be a multi-core (multi-CPU) processor. The processor herein may refer to one or more devices, circuits, and/or processing cores configured to process data (for example, a computer program instruction).

In an embodiment, the communications apparatus 30 may further include an output device 305 and an input device 306. The output device 305 communicates with the processor 301, and may display information in a plurality of manners. The input device 306 communicates with the processor 301, and may receive an input of a user in plurality of manners.

To better understand the embodiments provided below, the following first downlink information is described herein. For details, refer to Table 2.

TABLE 2

| Sequence number | First downlink information generation device | First downlink information forwarding device | First downlink information | |
|---|---|---|---|---|
| 1 | SMSF | AMF | Short message service message sent to UE (that is, a UE-terminated (mobile-terminated) SMS) | Information sent to the UE |
| 2 | PCF | AMF | Updated UE policy (policy), used to update a UE policy on the UE | |
| 3 | AMF | | Updated access and mobility management parameter on the UE, used to update an access and mobility management parameter on the UE | |
| 4 | | | Deregistration request message, used to deregister the UE | |
| 5 | UDM | AMF | Updated (or modified) UE subscription information, used to update subscription information on the UE | |
| 6 | NEF | AMF | Downlink information that is initiated by the NEF and that is used to trigger the UE to perform some processing, where for example, the AF triggers, by using the NEF and the AMF, the UE to initiate establishment of a PDU session for an application | |
| 7 | AMF | | NAS message sent to the UE, where the NAS message may include at least one of a short message service message, an updated UE policy (policy), and downlink information that is initiated by the NEF and that is used to trigger the UE to perform some processing | |
| 8 | SMF | AMF | Downlink information used to activate a PDU session of the UE | Information related to the PDU session of the UE |
| 9 | | AMF | Downlink information used to deactivate a PDU session of the UE | |
| 10 | | AMF | Downlink information used to update (or modify) a PDU session of the UE | |
| 11 | | AMF | Downlink information used to release a PDU session of the UE | |

In Table 2, SMSF is short for short message service function (short messaging service function), and SMS is short for short messaging service (short messaging service).

In Table 2, the first downlink information corresponding to the sequence numbers 1, 7.8, 9, and 10 may be included in an N1 interface message N2 interface message transfer message (Namf_Communication_N1N2MessageTransfer) that is provided by the AMF, for transmission. The first downlink information corresponding to the sequence number 2 may be included in an access and mobility policy control update notification message (Npcf_AMPolicyControl UpdateNotify) provided by the PCF, for transmission. The first downlink information corresponding to the sequence number 5may be included in a subscription data management notification message (Nudm_SDM_Notification) provided by the UDM, for transmission. The first downlink information corresponding to the sequence number 6 may be included in a trigger delivery request message (Nnef_Trigger_Deliveyrequest) provided by the NEF, for transmission. AM is short for access and mobility, and SDM is short for subscription data management.

Embodiment 1

Figure 4:
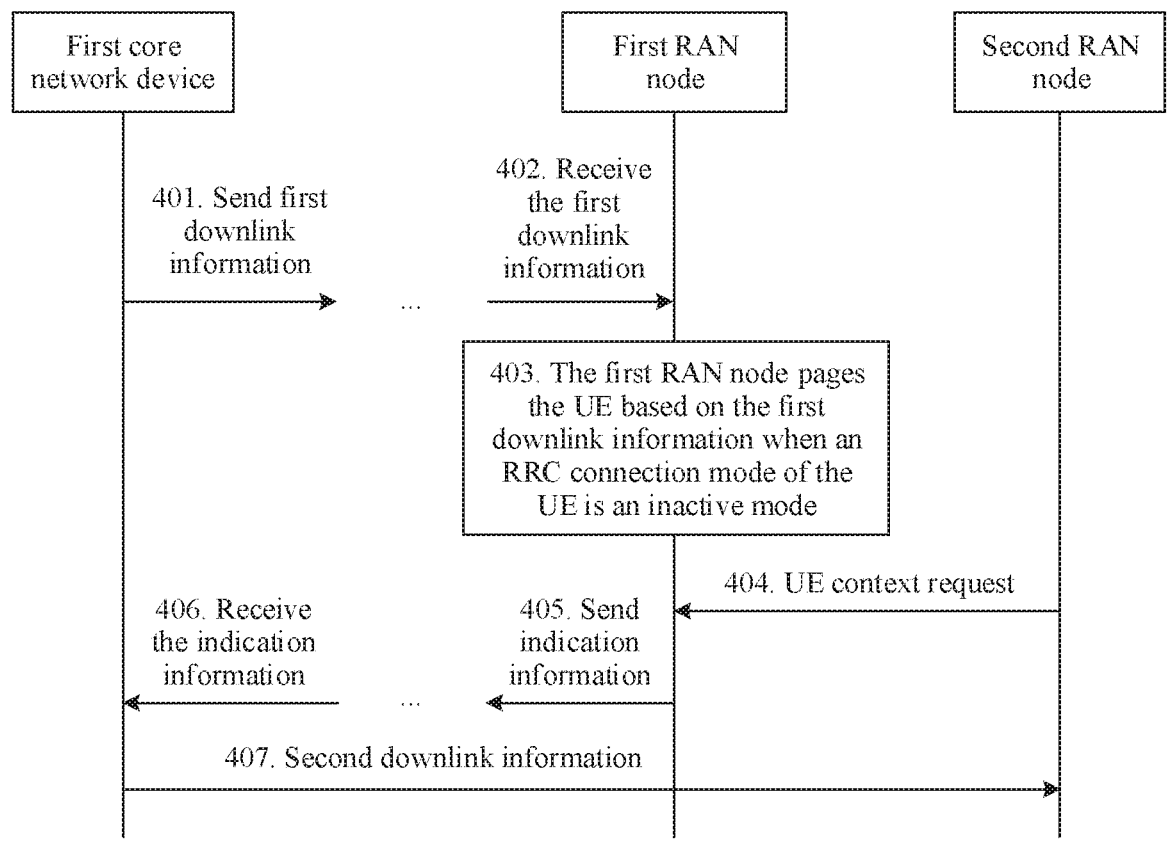
FIG. 4 is a schematic flowchart of a communication method according to an embodiment of this application.

This embodiment of this application provides a communication method, applied to a scenario in which UE whose RRC connection mode is an inactive mode moves from a coverage area of a first RAN node to a coverage area of a second RAN node. As shown in FIG. 4, the method includes the following steps.

401. A first core network device sends first downlink information to the first RAN node.

The first downlink information may be downlink information received by the first core network device from another network device, or may be downlink information generated by the first core network device. For example, the first core network device may be an SMSF, a PCF, a UDM, an NEF, an AMF, an SMF, or the like, and the another network device may be an AF.

For example, when the first downlink information is generated by the first core network device, if the first downlink information is information related to a PDU session of the UE (for example, downlink information used to activate/deactivate/modify/release the PDU session of the UE), the first core network device may be an SMF. When the first downlink information is a short message service message to be sent to the UE, the first core network device may be an SMSF. When the first downlink information is information used to update an access and mobility management parameter on the UE, the first core network device may be an AMF. For other cases, refer to Table 2, and details are not described herein again.

402. The first RAN node receives the first downlink information of the UE from the first core network device.

403. The first RAN node pages the UE based on the first downlink information when the RRC connection mode of the UE is an inactive mode.

In an example, a context of the UE stored in the first RAN node includes the RRC connection mode. When the RRC connection mode is a connected mode, the UE may exchange information with the first RAN node in the coverage area of the first RAN node. Therefore, when receiving the first downlink information, the first RAN node does not page the UE. For example, when the RRC connection mode of the UE is the connected mode, if the first RAN node receives the first downlink information used to activate the PDU session, the first RAN node may directly establish an air interface DRB data channel for the PDU session to the UE through RRC signaling interaction, and does not need to page the UE. When the RRC connection mode of the UE is the inactive mode, the first RAN node pages the UE.

404. The first RAN node receives a UE context request from the second RAN node.

When paging the UE, the first RAN node also notifies another RAN node (including the second RAN node) to page the UE. The RAN node may broadcast a paging (Paging) message to page the UE.

In an example, because the UE is already in the coverage area of the second RAN node at this time, the UE initiates an RRC connection resume request to the second RAN node, to respond to a paging message broadcast by the second RAN node. After receiving the RRC connection resume request of the UE, the second RAN node sends the context request to the first RAN node, where the context request is used to request to obtain a context of the UE, to resume an RRC connection of the UE.

405. The first RAN node sends indication information to the first core network device based on the context request.

Optionally, the indication information may indicate that the first downlink information fails to be processed. In other words, the indication information is used to indicate that the first core network device sends second downlink information to the second RAN node.

406. The first core network device receives the indication information from the first RAN node.

407. The first core network device sends the second downlink information to the second RAN node based on the indication information.

The first downlink information and the second downlink information may be partially or completely the same.

Functions of the first downlink information, the second downlink information, and the indication information may be any one of the following several cases:

Case 1: The first downlink information is used by the first RAN node to activate the PDU session of the UE, the PDU session is in an inactive state, the indication information is used to indicate that the PDU session fails to be activated, and the second downlink information is used by the second RAN node to activate the PDU session. The first downlink information is first downlink information corresponding to a sequence number 8 in Table 2.

The first downlink information may be N2 interface SM information (N2 SM information). The N2 interface SM information may be a QoS profile (QoS profile(s), which may also be referred to as QoS configuration information) and core network N3 interface tunnel information (CN N3 tunnel info, which may also be denoted as CN tunnel info). The CN N3 tunnel info may be used by the first RAN node to establish an N3 interface data channel between the first RAN node and a first UPF. The first UPF is a UPF that receives downlink data of the PDU session of the UE and that sends a data notification to the first core network device, where the data notification is used to notify the first core network device that there is downlink data of the UE that needs to be sent.

Case 2: The first downlink information is used by the first RAN node to deactivate the PDU session of the UE, the PDU session is in an active state, the indication information is used to indicate that the PDU session fails to be deactivated, and the second downlink information is used by the second RAN node to deactivate the PDU session. In this case, the second downlink information may be the same as the first downlink information.

The first downlink information may be first downlink information corresponding to a sequence number 9 in Table 2.

For example, the first downlink information may be N2 interface SM information. The N2 interface SM information may be a PDU session identifier.

Case 3: The first downlink information is used by the first RAN node to update the PDU session of the UE, the PDU session is in an active state, the indication information is used to indicate that the PDU session fails to be updated, and the second downlink information is used by the second RAN node to update the PDU session. In this case, the second downlink information may be the same as the first downlink information.

The first downlink information may be first downlink information corresponding to a sequence number 10 in Table 2.

The first downlink information may include N2 interface SM information and an N1 interface SM container. The N2 interface SM information is used by the RAN node to update a parameter related to the PDU session. The N2 interface SM information may be a QoS profile(s). The N1 interface SM container is used by the UE to update the parameter related to the PDU session. The N1 interface SM container may be a QoS profile(s).

Case 4: The first downlink information is used by the first RAN node to release the PDU session of the UE, the PDU session is in an active or inactive state, the indication information is used to indicate that the PDU session fails to be released, and the second downlink information is used by the second RAN node to release the PDU session. In this case, the second downlink information may be the same as the first downlink information.

The first downlink information may be first downlink information corresponding to a sequence number 11 in Table 2.

For example, the first downlink information may include an N2 resource release request (N2 Resource Release request) and/or an N1 interface SM container. The N2 resource release request includes a related parameter used by the first RAN node to release the PDU session, and the N1 interface SM container includes a related parameter used by the UE to release the PDU session. Both the N2 resource release request and the N1 interface SM container include a PDU session identifier. If the PDU session is in the active state, the first downlink information includes the N2 resource release request and the N1 interface SM container; if the PDU session is in the inactive state, the first downlink information includes the N1 interface SM container.

Case 5: The first downlink information is downlink information to be sent to the UE, the indication information is used to indicate that the first downlink information fails to be transmitted, and the second downlink information is the same as the first downlink information.

The first downlink information may be first downlink information corresponding to any one of sequence numbers 1 to 7 in Table 2. In any one of the case 1 to the case 4:

The first core network device may be an SMF. The first core network device may directly send the first downlink information to the first RAN node. Alternatively, the first core network device may send the first downlink information to another device, and the another device forwards the first downlink information to the first RAN node. The another device may be a control plane network element, for example, an AMF. For example, when the first core network device is an SMF, the SMF may send the first downlink information to the AMF, and the AMF forwards the first downlink information to the first RAN node.

When the first core network device directly sends the first downlink information to the first RAN node, the first RAN node may receive the first downlink information from the first core network device. When the first core network device sends the first downlink information to another device, and the another device forwards the first downlink information to the first RAN node, the first RAN node may receive the first downlink information from the another device.

In the case 5, the first core network device may be a device that generates the first downlink information, or may be a device that forwards the first downlink information. For example, when the first downlink information is a short message service message to be sent to the UE, the first core network device may be an SMSF (a device that generates the first downlink information) or an AMF (a device that forwards the first downlink information).

With reference to the foregoing five cases, the following further describes this embodiment by using different implementation scenarios. Details are as follows:

Optionally, in a first implementation scenario of this embodiment, the first downlink information, the second downlink information, and the indication information are described as those in the foregoing case 1. In the first implementation scenario:

In an example of an implementation of step 405, after receiving the context request sent by the second RAN node, the first RAN node may determine that the UE has initiated the RRC connection resume request to the second RAN node, the first RAN node does not activate the PDU session of the UE (for example, does not trigger establishment of an air interface DRB data channel between the UE and the first RAN node for the PDU session of the UE, or does not trigger establishment of an N3 interface data channel between the first RAN node and the first UPF for the PDU session of the UE), and the first RAN node sends the indication information to the first core network device.

In an example of an implementation of step 407, the first core network device may determine, based on the indication information, that the first RAN node fails in activating the PDU session of the UE, and send the second downlink information to the second RAN node currently serving the UE.

Optionally, the method further includes: generating, by the first core network device, the second downlink information based on current location information of the UE when the first core network device determines, based on the current location information of the UE, that the UE is not located in a valid area of the first downlink information. Alternatively, when the first core network device determines, based on current location information of the UE, that the terminal is located in a valid area of the first downlink information, the second downlink information and the first downlink information are the same.

The first core network device may compare the current location information of the UE with the valid area of the first downlink information, to determine whether the UE is currently located in the valid area of the first downlink information. The first downlink information is valid for a device in the valid area of the first downlink information.

The first downlink information includes the CN N3 tunnel info corresponding to the first UPF. Therefore, the first core network device may set the valid area of the first downlink information as a serving area of the first UPF. That is, the CN N3 tunnel info is valid only for UE located in the serving area of the first UPF (in other words, the CN N3 tunnel info is valid only for a RAN located in the serving area of the first UPF; or the CN N3 tunnel info is valid only for UE that is connected to a network via a RAN located in the serving area of the first UPF). Certainly, the first core network device may further set the valid area of the first downlink information based on other information (for example, a serving range of the first core network device, load information of the first UPF, and load information of a base station currently serving the UE). In the following description, an example in which the valid area of the first downlink information is the same as the serving area of the first UPF is used to describe the method provided in this embodiment of this application.

When the UE is not located in the valid area of the first downlink information currently (in other words, the second RAN node is not located in the valid area of the first downlink information), it means that the UE has left the serving area of the first UPF, and the first UPF cannot serve the UE anymore. Therefore, the first core network device may determine, based on the current location information of the UE, a RAN node (that is, the second RAN node) that currently serves the UE, and the first core network device selects a UPF (denoted as a second UPF) for the second RAN node. When the UE is not located in the valid area of the first downlink information currently, in an example of an implementation of step 407, the first core network device determines, based on the indication information, that the first RAN node fails in activating the PDU session of the UE, and sends CN N3 tunnel info corresponding to the second UPF to the second RAN node by including the CN N3 tunnel info in the second downlink information, so that the second RAN node activates the PDU session of the UE.

Figure 5:
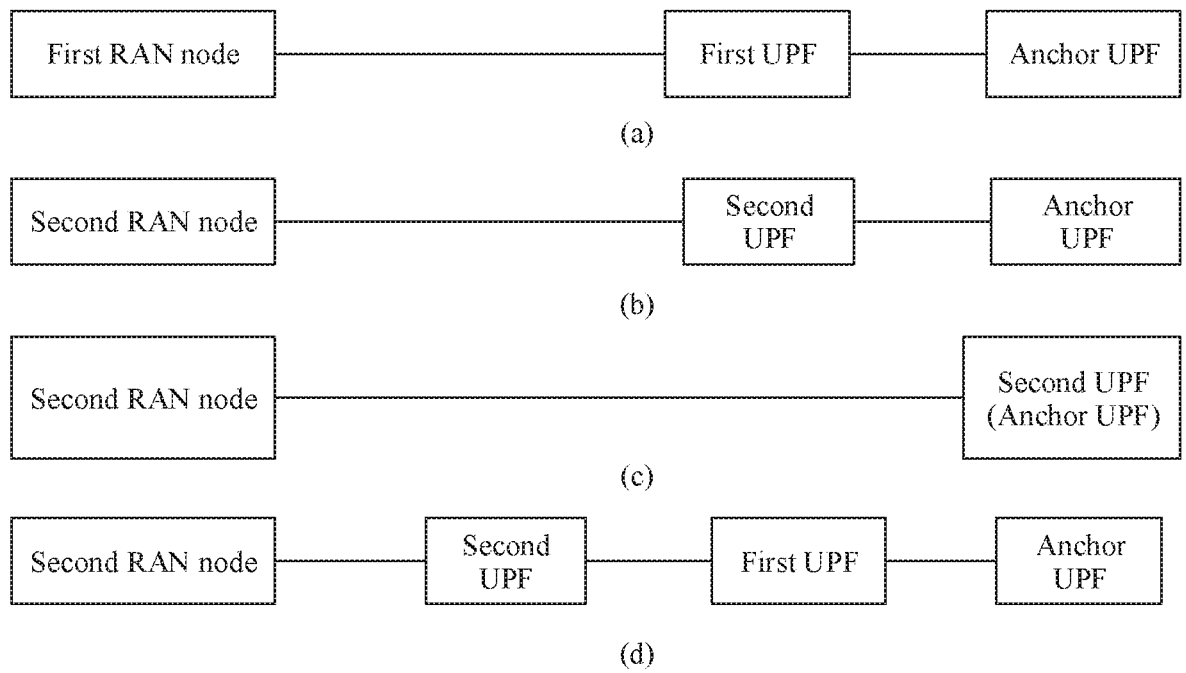
FIG. 5 is a schematic diagram of a UPF location according to an embodiment of this application.

The second UPF is an intermediate UPF selected by the SMF, and is configured to connect to the second RAN node to establish an N3 interface data channel for the PDU session. For example, referring to (a) in FIG. 5, the first RAN node is connected to the first UPF. Referring to (b), (c), and (d) in FIG. 5, the second RAN node is connected to the second UPF. Specifically, the second UPF may be directly connected to an anchor UPF (referring to (b) in FIG. 5), or may be connected to an anchor UPF via the first UPF (referring to (d) in FIG. 5) (in this case, the first UPF and the second UPF are different UPFs). The second UPF may alternatively be an anchor UPF (referring to (c) in FIG. 5).

When the UE is located in the valid area of the first downlink information currently (in other words, the second RAN node is located in the valid area of the first downlink information), the second RAN node and the first RAN node may establish, for the PDU session of the UE, an N3 interface data channel to a same UPF (that is, the foregoing first UPF). Therefore, the first downlink information and the second downlink information may be same information.

After step 407, the second RAN node activates the PDU session of the UE based on the received second downlink information. That the second RAN node activates the PDU session of the UE may specifically include: the second RAN node establishes, for the PDU session of the UE, a data channel between the UE and the second UPF, where the data channel between the UE and the second UPF includes an air interface DRB data channel between the UE and the second RAN node and an N3 interface data channel between the second RAN node and the second UPF.

In the first implementation scenario, when the first downlink information is used to activate the PDU session of the UE, if the first core network device receives the indication information, it indicates that the first RAN node fails in activating the PDU session. The first core network device may send the second downlink information to the second RAN node currently serving the UE, so that the second RAN node activates the PDU session of the UE based on the second downlink information. Because the second RAN node is a RAN node currently serving the UE, the second RAN node can successfully activate the PDU session of the UE.

Optionally, in a second implementation scenario of this embodiment, the first downlink information, the second downlink information, and the indication information are described as those in the foregoing case 2. In the second implementations scenario:

In an example of an implementation of step 405, after receiving the context request sent by the second RAN node, the first RAN node may determine that the UE has initiated the RRC connection resume request to the second RAN node, and the first RAN node does not deactivate the PDU session of the UE, but sends the indication information to the first core network device.

In an example of an implementation of step 407, the first core network device may determine, based on the indication information, that the first RAN node fails in deactivating the PDU session of the UE, and send the second downlink information to the second RAN node currently serving the UE. Because the UE is located in the coverage area of the second RAN node currently, the second RAN node can successfully deactivate the PDU session of the UE.

The first core network device may determine a to-be-deactivated PDU session by itself. For example, if a PDU session is a PDU session established for a local access data network (LADN for short), and the first core network device finds that the UE moves out of a serving area of the LADN, the first core network device determines to deactivate the PDU session. For another example, if a UPF notifies the first core network device that no data is transmitted for a PDU session within a specific time, the first core network device determines to deactivate the PDU session.

After step 407, the second RAN node deactivates the PDU session of the UE based on the received second downlink information. That the second RAN node deactivates the PDU session of the UE may specifically include: the second RAN node releases, based on a PDU session identifier in the second downlink information, a resource prepared for a PDU session corresponding to the PDU session identifier. For example, the second RAN node may release, by performing RRC signaling interaction (for example, RRC connection reconfiguration) with the UE, a DRB resource prepared for the PDU session corresponding to the PDU session identifier. The second RAN node may further release an N3 interface data channel resource for the PDU session (that is, release AN tunnel info and the CN tunnel info of the PDU session).

In the second implementation scenario, when the first downlink information is used to deactivate the PDU session of the UE, if the first core network device receives the indication information, the first core network device determines that the first RAN node fails in deactivating the PDU session. The first core network device sends the second downlink information to the second RAN node currently serving the UE, so that the second RAN node deactivates the PDU session of the UE based on the second downlink information. Because the second RAN node is a RAN node currently serving the UE, the second RAN node can successfully deactivate the PDU session of the UE.

Optionally, in a third implementation scenario of this embodiment, the first downlink information, the second downlink information, and the indication information are described as those in the foregoing case 3. In the third implementation scenario:

In an example of an implementation of step 405, after receiving the context request sent by the second RAN node, the first RAN node may determine that the UE has initiated the RRC connection resume request to the second RAN node, and the first RAN node does not update the PDU session of the UE, but sends the indication information to the first core network device.

In an example of an implementation of step 407, the first core network device may determine, based on the indication information, that the first RAN node fails in updating the PDU session of the UE, and send the second downlink information to the second RAN node currently serving the UE. Because the UE is located in the coverage area of the second RAN node currently, the second RAN node can successfully update the PDU session of the UE.

After step 407, the second RAN node updates the PDU session of the UE based on the received second downlink information. That the second RAN node updates the PDU session of the UE may specifically include at least one of the following processes: updating, based on the QoS profile(s) in the N2 interface SM information, a QoS profile(s) that is of the PDU session and that is stored in the second RAN node; sending the N1 SM container to the UE or performing RRC signaling interaction (for example, RRC reconfiguration) with the UE based on the QoS profile(s) in the N2 interface SM information to renegotiate DRB information corresponding to the PDU session, and updating the DRB information corresponding to the PDU session based on a negotiation result.

In the third implementation scenario, when the first downlink information is used to update the PDU session of the UE, if the first core network device receives the indication information, the first core network device determines that the first RAN node fails in updating the PDU session. The first core network device sends the second downlink information to the second RAN node currently serving the UE, so that the second RAN node updates the PDU session of the UE based on the second downlink information. Because the second RAN node is a RAN node currently serving the UE, the second RAN node can successfully update the PDU session of the UE.

Optionally, in a fourth implementation scenario of this embodiment, the first downlink information, the second downlink information, and the indication information are described as those in the foregoing case 4. In the fourth implementation scenario:

In an example of an implementation of step 405, after receiving the context request sent by the second RAN node, the first RAN node may determine that the UE has initiated the RRC connection resume request to the second RAN node, and the first RAN node does not release the PDU session of the UE, but sends the indication information to the first core network device.

In an example of an implementation of step 407, the first core network device may determine, based on the indication information, that the first RAN node fails in releasing the PDU session of the UE, and the first core network device sends the second downlink information to the second RAN node currently serving the UE. Because the UE is located in the coverage area of the second RAN node currently, the second RAN node can successfully release the PDU session of the UE.

After step 407, the second RAN node releases the PDU session of the UE based on the received second downlink information. That the second RAN node releases the PDU session of the UE may specifically include: the second RAN node releases, based on the PDU session identifier in the N2 resource release request, a resource prepared for the PDU session corresponding to the PDU session identifier. For example, the second RAN node may release, by performing RRC signaling interaction (for example, RRC reconfiguration) with the UE, a DRB resource prepared for the PDU session corresponding to the PDU session identifier. The second RAN node may further release an N3 interface data channel resource for the PDU session (that is, release AN tunnel info and the CN tunnel info of the PDU session); and send the N1 SM container to the UE.

In the fourth implementation scenario, when the first downlink information is used to release the PDU session of the UE, if the first core network device receives the indication information, the first core network device determines that the first RAN node fails in releasing the PDU session. The first core network device sends the second downlink information to the second RAN node currently serving the UE, so that the second RAN node releases the PDU session of the UE based on the second downlink information. Because the second RAN node is a RAN node currently serving the UE, the second RAN node can successfully release the PDU session of the UE.

Optionally, in a fifth implementation scenario of this embodiment, the first downlink information, the second downlink information, and the indication information are described as those in the foregoing case 5. In the fifth implementation scenario:

In an example of an implementation of step 405, after receiving the context request sent by the second RAN node, the first RAN node may determine that the UE is located in the coverage area of the second RAN node currently, and the first RAN node cannot successfully send the first downlink information to the UE. The first RAN node sends the indication information to the first core network device.

After receiving the indication information, the first core network device may determine that the first downlink information fails to be sent because the UE is located in the coverage area of the second RAN node currently. Therefore, the first core network device sends the first downlink information to the second RAN node, so that the second RAN node sends the first downlink information to the UE.

Optionally, when the first core network device is an AMF, the first core network device may perform step 401 when determining that the stored RRC connection mode of the UE is a connection management connected state. Alternatively, the first core network device may perform step 401 when determining that the stored RRC connection mode of the UE is a connection management connected state and that location information in the stored context of the UE indicates that the UE is in the coverage area of the first RAN node.

The first downlink information may have a valid area. In this case, if the first core network device determines, based on current location information of the UE, that the UE is located in the valid area of the first downlink information, the first core network device performs step 407. If the first core network device determines, based on current location information of the UE, that the UE is not located in the valid area of the first downlink information, the first core network device discards the first downlink information. The descriptions are also applicable to cases 5 in Embodiment 2 and Embodiment 3, and details are not further described in Embodiment 2 and Embodiment 3.

In the fifth implementation scenario, after sending the first downlink information to the first RAN node, if the first core network device receives the indication information fed back by the first RAN node, it indicates that the first RAN node fails in sending the first downlink information to the UE. In this case, the first core network device sends the first downlink information to the second RAN node currently serving the UE, so that the second RAN node sends the first downlink information to the UE. Because the UE is located in the coverage area of the second RAN node at this moment, the second RAN node can successfully send the first downlink information.

In the foregoing five implementation scenarios:

Optionally, the method may further include: sending, by the first RAN node, the current location information of the UE to the first core network device; and receiving, by the first core network device, the current location information of the UE from the first RAN node. The first core network device may determine, based on the current location information of the UE, a RAN node (that is, the second RAN node) that currently serves the UE. The current location information of the UE may be an identifier of a RAN node currently serving the UE, an ECGI of a cell in which the UE is currently located, a TAI or a TAC of a TA in which the UE is currently located, or the like.

Optionally, the indication information is a failure cause value (or referred to as a cause value).

Optionally, the failure cause value includes: the UE initiates an RRC connection resume procedure to another RAN node different from the first RAN node. Further, the failure cause value includes: the UE initiates an RRC connection resume procedure to the second RAN node. In this case, the indication information may include an identifier of the second RAN node.

The failure cause value may further include: the UE is performing handover; context transfer; the UE is unreachable at the first RAN node; or the first downlink information is not transmitted.

In a possible implementation, when the failure cause value includes that the UE initiates an RRC connection resume procedure to another RAN node different from the first RAN node, step 407 may be performed in the following two cases during specific implementation:

Case (1): Path switching in the RRC connection resume procedure is completed.

In this case, during specific implementation, step 407 may include: sending, by the first core network device, the second downlink information to the second RAN node based on the indication information after the path switching in the RRC connection resume procedure is completed.

Figure 6:
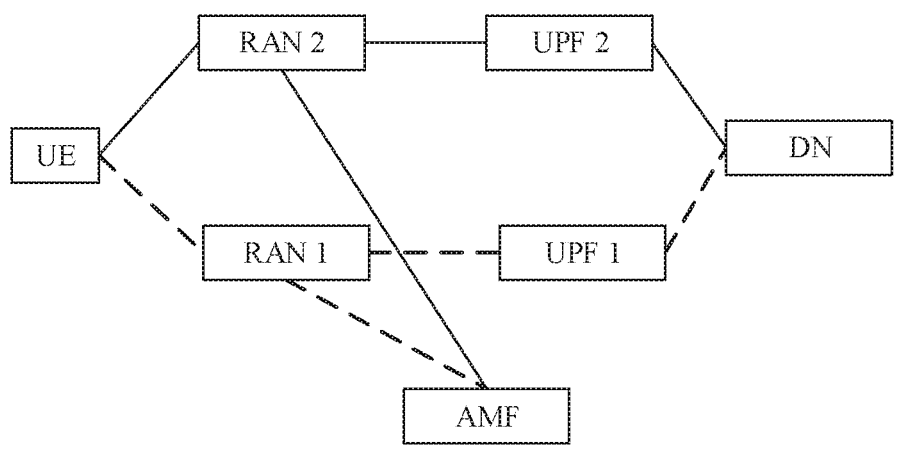
FIG. 6 is a schematic diagram of path switching according to an embodiment of this application.

The path switching means that a transmission path for control plane signaling of the UE and a transmission path for user plane data of the UE that are between the first RAN node and a core network are switched to transmission paths between the second RAN node and the core network. Referring to FIG. 6, the first RAN node is a RAN 1, the second RAN node is a RAN 2, the first UPF is a UPF 1, and the second UPF is a UPF 2. In this case, the path switching includes two parts. One part is switching a transmission path that is between the RAN 1 and the AMF and that is used to transmit control plane signaling of the UE to a transmission path between the RAN 2 and the AMF. The other part is switching a transmission path that is between the RAN 1 and the UPF 1 and that is used to transmit user plane data of the UE to a transmission path between the RAN 2 and the UPF 2.

In this case, the method may further include: sending, by the first core network device, a subscription request message to a second core network device, where the subscription request message is used to request the second core network device to send a notification message to the first core network device after the path switching in the RRC connection resume procedure is completed, and the notification message is used to notify that the path switching is completed; receiving, by the second core network device, the subscription request message from the first core network device; and sending, by the second core network device, the notification message to the first core network device after the path switching in the RRC connection resume procedure is completed. For example, the second core network device may determine, after sending an N2 interface path switching request response message (referring to step 914), that the RRC connection resume procedure is completed or the path switching in the RRC connection resume procedure is completed.

Case 2: The RRC connection resume procedure is completed.

In this case, during specific implementation, step 407 may include: sending, by the first core network device, the second downlink information to the second RAN node based on the indication information after the RRC connection resume procedure is completed.

Because the RRC connection resume procedure includes a path switching process, the first core network device may directly send the second downlink information to the second RAN node after the RRC connection resume procedure is completed.

In this case, the first core network device sends a subscription request message to a second core network device, where the subscription request message is used to request the second core network device to send a notification message to the first core network device after the RRC connection resume procedure is completed, and the notification message is used to notify that the RRC connection resume procedure is completed; the second core network device receives the subscription request message from the first core network device; and the second core network device sends the notification message to the first core network device after the RRC connection resume procedure is completed.

In both of the foregoing two cases, the first core network device sends the second downlink information to the second RAN node after the path switching is completed, to ensure that the second RAN node correctly receives the second downlink information. It may be understood that, if the first core network device sends the second downlink information to the second RAN node before the path switching is completed, the second downlink information sent by the AMF to the second RAN node fails to be sent or is still sent to the first RAN node connected to the AMF.

In another possible implementation, the first core network device may send the second downlink information to the second RAN node after a preset time (which may also be referred to as a preset time period) after the first core network device receives the indication information. Optionally, the preset time may be set by using a guard timer. In this case, in an example of an implementation of step 407, the first core network device starts a timer based on the indication information, and sends the second downlink information to the second RAN node after the timer expires. Duration preset on the timer is the preset time. For example, the preset time may be set to a time required for completing the RRC connection resume procedure of the UE.

Embodiment 2

Figure 7:
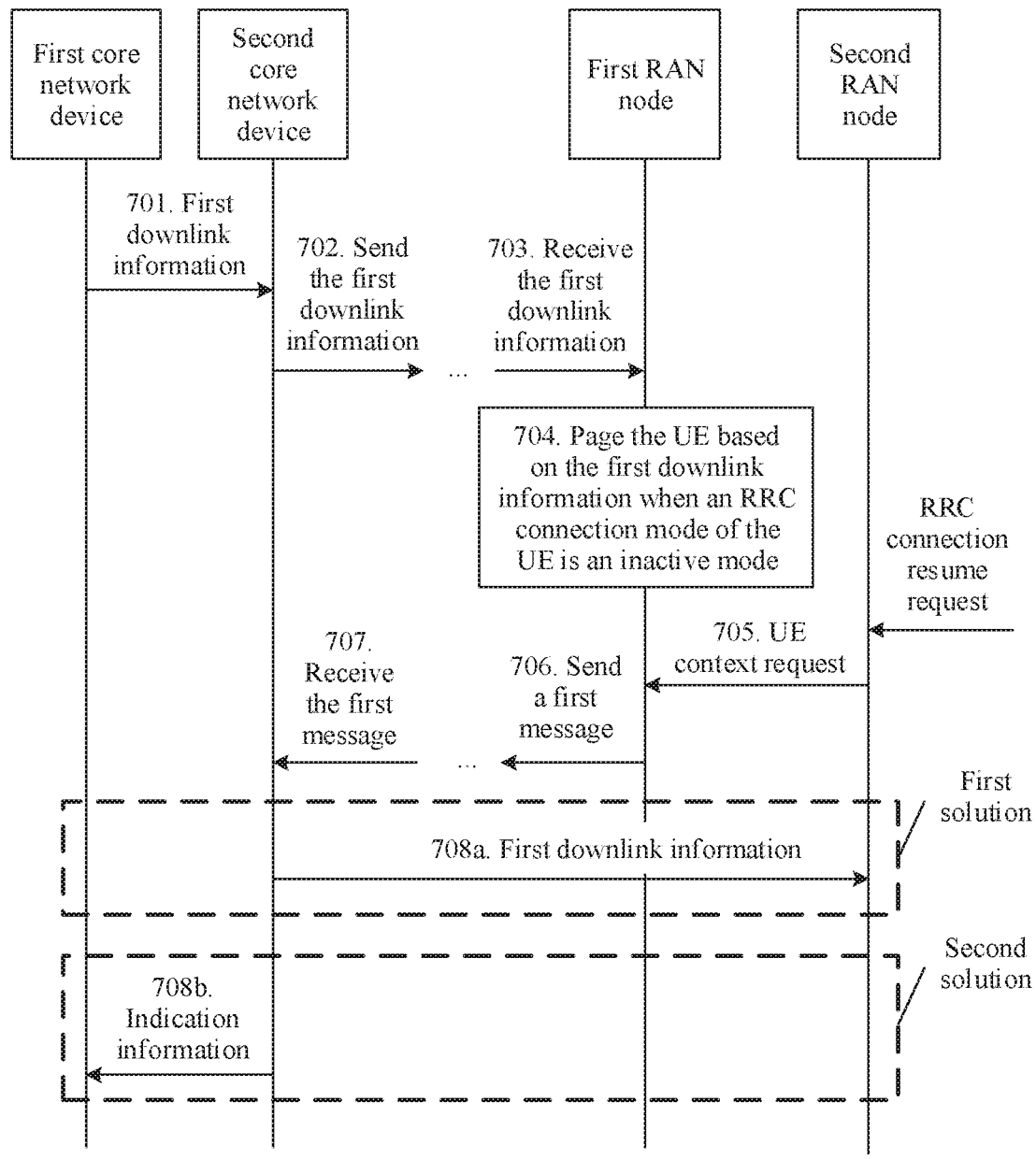
FIG. 7, FIG. 8, FIG. 9A, FIG. 9B, FIG. 10A, FIG. 10B, FIG. 10C, FIG. 11A, FIG. 11B, FIG. 12A.

The information transmitted between the first core network device and the first RAN node in Embodiment 1 may also be sensed by the second core network device. In this case, this embodiment of this application further provides two communication methods, applied to a scenario in which UE whose RRC connection mode is an inactive mode moves from a coverage area of a first RAN node to a coverage area of a second RAN node. As shown in FIG. 7, FIG. 7 includes two solutions. A first solution includes step 701 to step 707 and step 708a, and a second solution includes step 701 to step 707 and step 708b. One solution is one communication method. The solutions include the following steps.

701. A first core network device sends first downlink information to a second core network device.

The first downlink information in the first core network device may be downlink information received by the first core network device from another core network device, or may be downlink information generated by the first core network device. The first downlink information is downlink information of the UE.

For example, when the first downlink information is information related to a PDU session of the UE, the first core network device may be an SMF, and the second core network device may be an AMF. When the first downlink information is a short message service message sent to the UE, the first core network device may be an SMSF, and the second core network device may be an AMF. For other cases, refer to Table 2, and details are not described herein again.

702. The second core network device receives the first downlink information from the first core network device, and sends the first downlink information to the first RAN node.

703. The first RAN node receives the first downlink information of the UE from the second core network device.

704. The first RAN node pages the UE based on the first downlink information when the RRC connection mode of the UE is an inactive mode.

For related descriptions of step 704, refer to step 403. Details are not described herein again.

705. The first RAN node receives a UE context request from the second RAN node.

For related descriptions of step 705, refer to step 404. Details are not described herein again.

706. The first RAN node sends a first message to the second core network device based on the context request.

Optionally, the first message may indicate that the first downlink information fails to be processed.

707. The second core network device receives the first message from the first RAN node.

708a. The second core network device sends the first downlink information to the second RAN node based on the first message.

Optionally, the method may further include: sending, by the first RAN node, current location information of the UE to the second core network device; and receiving, by the second core network device, the current location information of the UE from the first RAN node. The second core network device may determine, based on the current location information of the UE, a RAN node (that is, the second RAN node) that currently serves the UE, and send the first downlink information to the second RAN node based on the first message. The current location information of the UE may be an identifier of a RAN node currently serving the UE, an ECGI of a cell in which the UE is currently located, a TAI or a TAC of a TA in which the UE is currently located, or the like.

708b. The second core network device sends indication information to the first core network device based on the first message.

Functions of the first downlink information, second downlink information, and the first message may be any one of the following cases 1 to 5:

Case 1: The first downlink information is used by the first RAN node to activate the PDU session of the UE, the PDU session is in an inactive state, and the first message is used to indicate that the PDU session fails to be activated.

For related descriptions of the first downlink information and how the second RAN node activates the PDU session, refer to corresponding descriptions in the case 1 in Embodiment 1. Details are not described herein again.

In the case 1, in this embodiment:

In this embodiment, a message type or a message name of the first message may be used to indicate that the PDU session fails to be activated. For example, when the message type is a failure message or a reject message, the first message may be used to indicate that the PDU session fails to be activated. In this embodiment, alternatively, indication information may be added to the first message to indicate that the PDU session fails to be activated. For related descriptions of the indication information, refer to the following descriptions. The second core network device may determine, based on the first message, that the first RAN node fails in activating the PDU session of the UE.

In an example of an implementation of step 706, after receiving the context request sent by the second RAN node, the first RAN node may determine that the UE has initiated an RRC connection resume request to the second RAN node, and the first RAN node does not activate the PDU session of the UE (for example, does not trigger establishment of an air interface DRB data channel between the UE and the first RAN node for the PDU session of the UE, or does not trigger establishment of an N3 interface data channel between the first RAN node and the first UPF for the PDU session of the UE), but sends the first message to the second core network device.

Optionally, the method may further include: receiving, by the second core network device from the first core network device, information about a valid area of the first downlink information, where the first downlink information is valid for a device in the valid area of the first downlink information. The information about the valid area of the first downlink information and the first downlink information may be included in a same message.

In this case, optionally, the second core network device performs step 708a when determining, based on the current location information of the UE and the information about the valid area of the first downlink information, that the UE is located in the valid area; or the second core network device performs step 708b when determining, based on the current location information of the UE and the information about the valid area of the first downlink information, that the UE is not located in the valid area.

Based on the description about whether the UE is located in the valid area in Embodiment 1, it can be learned that when the second core network device determines, based on the current location information of the UE and the information about the valid area of the first downlink information, that the UE is located in the valid area, the first downlink information sent to the first RAN node may be the same as the downlink information sent to the second RAN node. Therefore, the second core network device may directly send the first downlink information to the second RAN node; or certainly, may send the indication information to the first core network device, so that the first core network device sends the first downlink information to the second RAN node.

When the second core network device determines, based on the current location information of the UE and the information about the valid area of the first downlink information, that the UE is not located in the valid area, the downlink information sent to the second RAN node is different from the first downlink information sent to the first RAN node. Therefore, the second core network device may send the indication information to the first core network device, so that the first core network device constructs the second downlink information to be sent to the second RAN node. In other words, after step 708b, the process of "sending the second downlink information to the second RAN node by the first core network device" in step 407 may be performed. For implementation of the process, refer to the foregoing description. Details are not described herein again.

It should be noted that in a process of performing step 407, the first core network device sends the first downlink information or the second downlink information to the second RAN node based on a determining result of whether the UE is located in the valid area. In this embodiment, in a process of determining to perform step 708a or step 708b, the second core network device has determined whether the UE is located in the valid area. Therefore, if the first core network device receives the indication information, the first core network device may directly construct the second downlink information to be sent to the second RAN node, and does not need to determine whether the UE is located in the valid area.

Optionally, when the first core network device is an SMF, the second core network device is an AMF, and the AMF determines, based on the current location information of the UE and the information about the valid area of the first downlink information, that the UE is located in the valid area, if the SMF is the same as an SMF corresponding to an active PDU session (or a PDU session reported by the second RAN node in a path switching process) of the UE, step 708*b* is performed. If the SMF is different from the SMF corresponding to the active PDU session of the UE, step 708*a* is performed. The "active PDU session of the UE" herein does not include a PDU session rejected by the second RAN node.

Table 1 is used as an example. It should be noted that in the foregoing path switching process, the AMF reports, to the SMF 1, a PDU session that needs to be updated, where the PDU session that needs to be updated is an active PDU session (for example, a PDU session 2, a PDU session 3) that is of the UE and that is accepted by the second RAN node. The first downlink information previously sent by the SMF 1 to the AMF is used to activate the PDU session of the UE, the PDU session is in an inactive state (that is, the PDU session 1).

If the SMF 1 and the SMF 2 are a same SMF, the AMF needs to send indication information to the SMF 1, to indicate that the PDU session fails to be activated. Otherwise, after the SMF 1 receives the PDU session that needs to be updated and that is reported by the AMF, the SMF 1 does not know a subsequent step to be performed because the SMF 1 does not receive a status feedback of the PDU session 1. Therefore, in this case, the second core network device may perform step 708*b*.

If the SMF 1 and the SMF 2 are different SMFs, the SMF 1 does not receive the PDU session that needs to be updated and that is reported by the AMF. Therefore, the second core network device may perform step 708*a*.

Optionally, during specific implementation of step 702, the second core network device may send the first downlink information to the first RAN node when a status of the UE in the second core network device is a connection management connected state and when the second core network device determines, based on location information in a stored context of the UE and the information about the valid area of the first downlink information, that the UE is located in the valid area of the first downlink information.

Based on the foregoing description, when the RRC connection mode of the UE is a connected mode or an inactive mode, the second core network device stores the context of the UE, where the context includes the location information of the UE, and the second core network device considers that the location information in the context is the current location information of the UE. Therefore, when determining, based on the location information in the stored context of the UE and the information about the valid area of the first downlink information, that the UE is located in the valid area of the first downlink information, the second core network device considers that the first downlink information is valid for the UE. In this case, the second core network device sends the first downlink information to the first RAN node.

Case 2: The first downlink information is used by the first RAN node to deactivate the PDU session of the UE, the PDU session is in an active state, and the first message is used to indicate that the PDU session fails to be deactivated.

In this case, for related descriptions of the first downlink information and how the second RAN node deactivates the PDU session, refer to corresponding descriptions in the case 2 in Embodiment 1. Details are not described herein again.

In the case 2, in this embodiment:

Specifically, in this embodiment, a message type or a message name of the first message may be used to indicate that the PDU session fails to be deactivated. For example, when the message type is a failure message or a reject message, the first message may be used to indicate that the PDU session fails to be deactivated. In this embodiment, alternatively, indication information may be added to the first message to indicate that the PDU session fails to be deactivated. For related descriptions of the indication information, refer to the following descriptions.

In an example of an implementation of step 706, after receiving the context request sent by the second RAN node, the first RAN node may determine that the UE has initiated an RRC connection resume request to the second RAN node, and the first RAN node does not deactivate the PDU session of the UE. In this case, the first RAN node sends the first message to the second core network device.

Case 3: The first downlink information is used by the first RAN node to update the PDU session of the UE, the PDU session is in an active state, and the first message is used to indicate that the PDU session fails to be updated.

In this case, for related descriptions of the first downlink information and how the second RAN node updates the PDU session, refer to corresponding descriptions in the case 3 in Embodiment 1. Details are not described herein again.

In the case 3, in this embodiment:

In this embodiment, a message type or a message name of the first message may be used to indicate that the PDU session fails to be updated. For example, when the message type is a failure message or a reject message, the first message may be used to indicate that the PDU session fails to be updated. In this embodiment, alternatively, indication information may be added to the first message to indicate that the PDU session fails to be updated. For related descriptions of the indication information, refer to the following descriptions.

In an example of an implementation of step 706, after receiving the context request sent by the second RAN node, the first RAN node may determine that the UE has initiated an RRC connection resume request to the second RAN node, and the first RAN node does not update the PDU session of the UE. In this case, the first RAN node sends the first message to the second core network device.

Case 4: The first downlink information is used by the first RAN node to release the PDU session of the UE, the PDU session is in an active state, and the first message is used to indicate that the PDU session fails to be released.

In this case, for related descriptions of the first downlink information and how the second RAN node releases the PDU session, refer to corresponding descriptions in the case 4 in Embodiment 1. Details are not described herein again.

In the case 4, in this embodiment:

Specifically, in this embodiment, a message type or a message name of the first message may be used to indicate that the PDU session fails to be released. For example, when the message type is a failure message or a reject message, the first message may be used to indicate that the PDU session fails to be released. In this embodiment, alternatively, indication information may be added to the first message to indicate that the PDU session fails to be released. For related descriptions of the indication information, refer to the following descriptions.

In an example of an implementation of step 706, after receiving the context request sent by the second RAN node, the first RAN node may determine that the UE has initiated an RRC connection resume request to the second RAN node, and the first RAN node does not release the PDU session of the UE. In this case, the first RAN node sends the first message to the second core network device.

In any one of the case 1 to the case 4:

The first core network device may be an SMF, and the second core network device may be an AMF.

Case 5: The first downlink information is downlink information to be sent to the UE, and the first message is used to indicate that the first downlink information fails to be transmitted.

In this case, for related descriptions of the first downlink information, refer to corresponding descriptions in the case 5 in Embodiment 1. Details are not described herein again.

In the case 5, in this embodiment:

Specifically, in this embodiment, a message type or a message name of the first message may be used to indicate that the first downlink information fails to be transmitted. For example, when the message type is a failure message or a reject message, the first message may be used to indicate that the first downlink information fails to be transmitted. In this embodiment, alternatively, indication information may be added to the first message to indicate that the first downlink information fails to be transmitted. For related descriptions of the indication information, refer to the following descriptions.

The first core network device may be a device that generates the first downlink information, and the second core network device may be a device that forwards the first downlink information. For example, when the first downlink information is a short message service message to be sent to the UE, the first core network device may be an SMSF (a device that generates the first downlink information), and the second core network device may be an AMF (a device that forwards the first downlink information).

In an example of an implementation of step 706, after receiving the context request sent by the second RAN node, the first RAN node may determine that the UE is located in the coverage area of the second RAN node currently, and the first RAN node cannot successfully send the first downlink information to the UE. In this case, the first RAN node sends the first message to the second core network device.

After receiving the first message, the second core network device may determine that the first downlink information fails to be sent. Because the UE is located in the coverage area of the second RAN node currently, the second core network device sends the first downlink information to the second RAN node, so that the second RAN node sends the first downlink information to the UE. Certainly, the second core network device may alternatively send the indication information to the first core network device, so that the first core network device sends the first downlink information to the second RAN node.

In any one of the case 1 to the case 5:

Optionally, the indication information is a failure cause value (or referred to as a cause value).

Optionally, the failure cause value includes: the UE initiates an RRC connection resume procedure to another RAN node different from the first RAN node. Further, the failure cause value includes: the UE initiates an RRC connection resume procedure to the second RAN node. In this case, the indication information may include an identifier of the second RAN node.

The failure cause value may further include: the UE is performing handover; context transfer; the UE is unreachable at the first RAN node; or the first downlink information is not transmitted.

In a possible implementation, step 708a may be performed after the RRC connection resume procedure initiated by the UE is completed. In other words, step 708a may include: sending, by the second core network device, the first downlink information to the second RAN node based on the first message after the RRC connection resume procedure is completed. Alternatively, step 708a may be performed after the path switching in the RRC connection resume procedure initiated by the UE is completed. In other words, step 708a may include: sending, by the second core network device, the first downlink information to the second RAN node based on the first message after the path switching in the RRC connection resume procedure is completed. For example, the second core network device may determine, after sending an N2 interface path switching request response message (referring to step 914), that the RRC connection resume procedure is completed or the path switching in the RRC connection resume procedure is completed.

For related descriptions of the path switching and beneficial effects of the possible implementation, refer to related parts in Embodiment 1. Details are not described herein again.

In another possible implementation, the second core network device may send the first downlink information to the second RAN node or send the indication information to the first core network device after a preset time after the second core network device receives the first message. Optionally, the preset time may be set by using a guard timer. In this case, in an example of an implementation of step 708a, the second core network device starts a timer based on the first message, and sends the first downlink information to the second RAN node after the timer expires. In an example of an implementation of step 708b, the second core network device starts a timer based on the first message, and sends the indication information to the first core network device after the timer expires. Duration preset on the timer is the preset time. For example, the preset time may be set to a time required for completing the RRC connection resume procedure of the UE.

That the first downlink information is used to activate the PDU session is used as an example. The second core network device may determine, based on the first message, that the PDU session of the UE fails to be activated. In this case, the second core network device may notify the first core network device of information indicating that the PDU session fails to be activated, and the first core network device determines a subsequent action to be performed. When the indication information in the first message is used to indicate that the PDU session fails to be activated, the second core network device may directly send the indication information in the first message to the first core network device, or generate another piece of indication information based on the indication information and send the another piece of indication information to the first core network device, where the another piece of indication information is also used to indicate that the PDU session fails to be activated. When the message type or the message name of the first message is used to indicate that the PDU session fails to be activated, the second RAN node may generate indication information and send the indication information to the first core network device.

In any one of the case 2 to the case 5, after step 708*b*, the first core network device may perform step 407 of "sending the second downlink information to the second RAN node by the first core network device" in Embodiment 1. In this case, the second downlink information is the same as the first downlink information.

For beneficial effects of the case 1 to the case 5 in Embodiment 2, refer to beneficial effects of corresponding cases in Embodiment 1.

Embodiment 3

Figure 8:
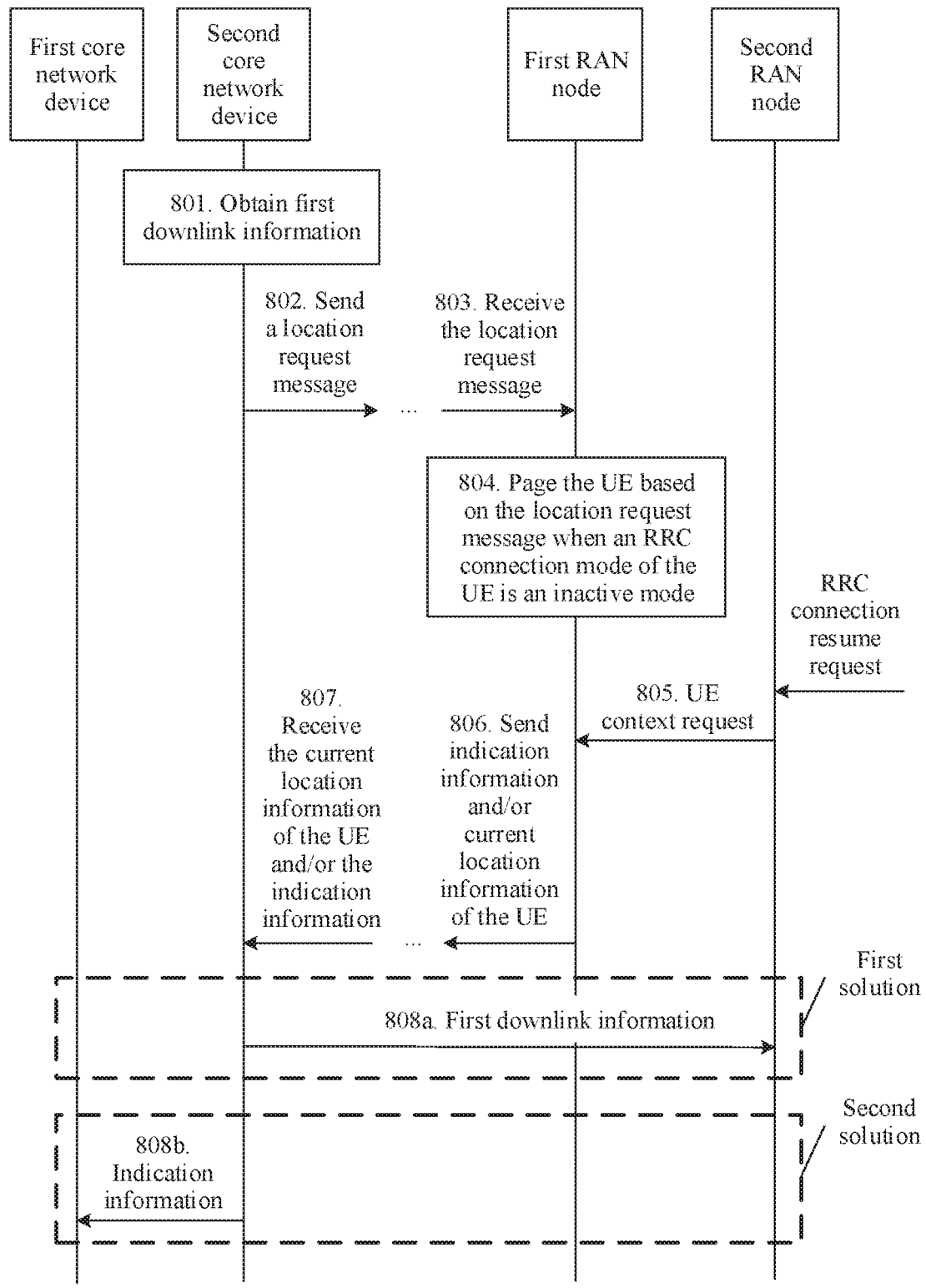

This embodiment of this application further provides a communication method. In the method, after obtaining first downlink information, a second core network device obtains current location information of UE, and processes the first downlink information based on the current location information of the UE. The method is applied to a scenario in which UE whose RRC connection mode is an inactive mode moves from a coverage area of a first RAN node to a coverage area of a second RAN node. FIG. 8 includes two solutions. A first solution includes step 801 to step 807 and step 808*a*, and a second solution includes step 801 to step 807 and step 808*b*. One solution is one communication method. The solutions include the following steps.

801. The second core network device obtains the first downlink information.

The first downlink information may be downlink information received by the second core network device from a first core network device, or may be downlink information generated by the second core network device.

For example, when the first downlink information is information related to a PDU session of the UE, the second core network device may be an AMF, and the first downlink information may be downlink information received by the AMF from an SMF. When the first downlink information is a short message service message to be sent to the UE, the second core network device may be an AMF, and the first downlink information may be downlink information received by the AMF from an SMSF. When the first downlink information is an updated access and mobility management parameter on the UE, the second core network device may be an AMF, and the first downlink information may be downlink information generated by the AMF. For other cases, refer to Table 2, and details are not described herein again.

802. The second core network device sends a location request message to the first RAN node, where the location request message is used to request the current location information of the UE.

Because the second core network device determines, based on location information in a stored context of the UE, that a RAN node serving the UE is the first RAN node, the second core network device sends the location request message to the first RAN node.

803. The first RAN node receives the location request message from the second core network device.

804. The first RAN node pages the UE based on the location request message when the RRC connection mode of the UE is an inactive mode.

For related descriptions of paging the UE by the first RAN node, refer to the foregoing step 403. Details are not described herein again.

805. The first RAN node receives a UE context request from the second RAN node.

For related descriptions of step 805, refer to the foregoing step 404. Details are not described herein again.

806. The first RAN node sends, to the second core network device based on the context request, indication information indicating that the UE initiates an RRC connection resume procedure to another RAN node different from the first RAN node, and/or the current location information of the UE.

After receiving the context request sent by the second RAN node, the first RAN node may determine that the UE is located in the coverage area of the second RAN node currently. Therefore, the first RAN node may send, to the second core network device, the indication information indicating that the UE initiates the RRC connection resume procedure to the another RAN node different from the first RAN node, and/or the current location information of the UE. In this case, the RAN node serving the UE is the second RAN node. Therefore, the current location information of the UE may indicate that the RAN node currently serving the UE is the second RAN node.

807. The second core network device receives the current location information of the UE from the first RAN node, and/or the second core network device receives, from the first RAN node, the indication information indicating that the UE initiates the RRC connection resume procedure to the another RAN node different from the first RAN node.

It may be understood that when the first RAN node sends, to the second core network device, the indication information indicating that the UE initiates the RRC connection resume procedure to the another RAN node different from the first RAN node, the second core network device receives the indication information from the first RAN node. When the first RAN node sends the current location information of the UE to the second core network device, the second core network device receives the current location information of the UE from the first RAN node. When the first RAN node sends, to the second core network device, the indication information indicating that the UE initiates the RRC connection resume procedure to the another RAN node different from the first RAN node and the current location information of the UE, the second core network device receives the indication information and the current location information of the UE from the first RAN node.

After step 807, when the first downlink information of the UE is used to activate/deactivate/update/release the PDU session of the UE, step 808*a* or 808*b* may be performed; or when the first downlink information of the UE is to be sent to the UE, step 808*a* may be performed.

808*a*. The second core network device sends the first downlink information to the second RAN node.

808*b*. The second core network device sends the indication information to the first core network device.

The first downlink information may be any information in the following cases 1 to 5:

Case 1: The first downlink information is used by the first RAN node to activate the PDU session of the UE, and the PDU session is in an inactive state.

In this case, for related descriptions of the first downlink information and how the second RAN node activates the PDU session, refer to corresponding descriptions in the case 1 in Embodiment 1. Details are not described herein again.

In the case 1, in this embodiment:

In an example of an implementation of step 806, after receiving the context request sent by the second RAN node, the first RAN node may determine that the UE has initiated an RRC connection resume request to the second RAN node. In this case, the first RAN node sends the indication information and/or the current location information of the UE to the second core network device. For specific causes, refer to the foregoing descriptions.

Optionally, the method may further include: receiving, by the second core network device from the first core network device, information about a valid area of the first downlink information, where the first downlink information is valid for a device in the valid area of the first downlink information. The information about the valid area of the first downlink information and the first downlink information may be included in a same message.

In this case, optionally, the second core network device performs step 808*a* when determining, based on the current location information of the UE and the information about the valid area of the first downlink information, that the UE is located in the valid area; or the second core network device performs step 808*b* when determining, based on the current location information of the UE and the information about the valid area of the first downlink information, that the UE is not located in the valid area.

Based on the description about whether the UE is located in the valid area in Embodiment 1, it can be learned that when the second core network device determines, based on the current location information of the UE and the information about the valid area of the first downlink information, that the UE is located in the valid area, the first downlink information sent to the first RAN node may be the same as the downlink information sent to the second RAN node. Therefore, the second core network device may directly send the first downlink information to the second RAN node; or certainly, may send the indication information to the first core network device, so that the first core network device sends the first downlink information to the second RAN node.

When the second core network device determines, based on the current location information of the UE and the information about the valid area of the first downlink information, that the UE is not located in the valid area, the downlink information sent to the second RAN node is different from the first downlink information sent to the first RAN node. Therefore, the second core network device may send the indication information to the first core network device, so that the first core network device constructs second downlink information to be sent to the second RAN node. In other words, after step 808*b*, the process of "sending the second downlink information to the second RAN node by the first core network device" in step 407 may be performed. For implementation of the process, refer to the foregoing description. Details are not described herein again.

It should be noted that in a process of performing step 407, the first core network device sends the first downlink information or the second downlink information to the second RAN node based on a determining result of whether the UE is located in the valid area. In this embodiment, in a process of determining to perform step 808*a* or step 808*b*, the second core network device has determined whether the UE is located in the valid area. Therefore, if the first core network device receives the indication information, the first core network device may directly construct the second downlink information to be sent to the second RAN node, and does not need to determine whether the UE is located in the valid area.

Optionally, when the first core network device is an SMF, the second core network device is an AMF, and the AMF determines, based on the current location information of the UE and the information about the valid area of the first downlink information, that the UE is located in the valid area, if the SMF is the same as an SMF corresponding to an active PDU session (or a PDU session reported by the second RAN node in a path switching process) of the UE, step 808*b* is performed. If the SMF is different from the SMF corresponding to the active PDU session of the UE, step 808*a* is performed. The "active PDU session of the UE" herein does not include a PDU session rejected by the second RAN node. For beneficial effects of the optional method, refer to the foregoing description. Details are not described herein again.

Case 2: The first downlink information is used by the first RAN node to deactivate the PDU session of the UE.

In this case, for related descriptions of the first downlink information and how the second RAN node deactivates the PDU session, refer to corresponding descriptions in the case 2 in Embodiment 1. Details are not described herein again.

In the case 2, in this embodiment:

In an example of an implementation of step 806, after receiving the context request sent by the second RAN node, the first RAN node may determine that the UE has initiated an RRC connection resume request to the second RAN node. Therefore, if the first RAN node does not deactivate the PDU session, the first RAN node sends the indication information and/or the current location information of the UE to the second core network device.

Case 3: The first downlink information is used by the first RAN node to update the PDU session of the UE.

In this case, for related descriptions of the first downlink information and how the second RAN node updates the PDU session, refer to corresponding descriptions in the case 3 in Embodiment 1. Details are not described herein again.

In the case 3, in this embodiment: In an example of an implementation of step 806, after receiving the context request sent by the second RAN node, the first RAN node may determine that the UE has initiated an RRC connection resume request to the second RAN node. Therefore, if the first RAN node does not update the PDU session, the first RAN node sends the indication information and/or the current location information of the UE to the second core network device.

Case 4: The first downlink information is used by the first RAN node to release the PDU session of the UE.

In this case, for related descriptions of the first downlink information and how the second RAN node releases the PDU session, refer to corresponding descriptions in the case 4 in Embodiment 1. Details are not described herein again.

In the case 4, in this embodiment:

In an example of an implementation of step 806, after receiving the context request sent by the second RAN node, the first RAN node may determine that the UE has initiated an RRC connection resume request to the second RAN node. Therefore, if the first RAN node does not release the PDU session, the first RAN node sends the indication information and/or the current location information of the UE to the second core network device.

In any one of the case 1 to the case 4:

The first core network device may be an SMF, and the second core network device may be an AMF.

Case 5: The first downlink information is downlink information to be sent to the UE. The first core network device may be a device that generates the first downlink information, and the second core network device may be a device that forwards the first downlink information. For example, when the first downlink information is a short message service message to be sent to the UE, the first core network device may be an SMSF (a device that generates the first downlink information), and the second core network device may be an AMF (a device that forwards the first downlink information).

Alternatively, the second core network device may be a device that generates the first downlink information.

In this case, for related descriptions of the first downlink information, refer to corresponding descriptions in the case 5 in Embodiment 1. Details are not described herein again.

In the case 5, in this embodiment:

In an example of an implementation of step 806, after receiving the context request sent by the second RAN node, the first RAN node may determine that the UE is located in the coverage area of the second RAN node currently. Therefore, if the first RAN node cannot successfully send the first downlink information to the UE, the first RAN node sends the indication information and/or the current location information of the UE to the second core network device.

After receiving the indication information and/or the current location information of the UE, the second core network device may determine that the first downlink information fails to be sent. Because the UE is located in the coverage area of the second RAN node currently, the second core network device sends the first downlink information to the second RAN node, so that the second RAN node sends the first downlink information to the UE. Certainly, the second core network device may alternatively send the indication information to the first core network device, so that the first core network device sends the first downlink information to the second RAN node.

In a possible implementation, step 808a may be performed after the RRC connection resume procedure initiated by the UE is completed. In other words, step 808a may include: sending, by the second core network device, the first downlink information to the second RAN node after the RRC connection resume procedure is completed. Alternatively, step 808a may be performed after the path switching in the RRC connection resume procedure initiated by the UE is completed. In other words, step 808a may include: sending, by the second core network device, the first downlink information to the second RAN node after the path switching in the RRC connection resume procedure is completed. For example, the second core network device may determine, after sending an N2 interface path switching request response message (referring to step 914), that the RRC connection resume procedure is completed or the path switching in the RRC connection resume procedure is completed.

For related descriptions of the path switching and beneficial effects of the possible implementation, refer to related parts in Embodiment 1. Details are not described herein again.

In another possible implementation, the second core network device may send the first downlink information to the second RAN node or send the indication information to the first core network device after a preset time after the second core network device receives the indication information and/or the current location information of the UE. Optionally, the preset time may be set by using a guard timer. In this case, in an example of an implementation of step 808a, the second core network device starts a timer, and sends the first downlink information to the second RAN node after the timer expires. In an example of an implementation of step 808b, the second core network device starts a timer, and sends the indication information to the first core network device after the timer expires. Duration preset on the timer is the preset time. For example, the preset time may be set to a time required for completing the RRC connection resume procedure of the UE.

That the first downlink information is used to activate the PDU session is used as an example. The second core network device may determine, based on the indication information and/or the current location information of the UE, that the PDU session of the UE fails to be activated. In this case, the second core network device may notify the first core network device of information indicating that the PDU session fails to be activated, and the first core network device determines a subsequent action to be performed. When the indication information is used to indicate that the PDU session fails to be activated, the second core network device may directly send the indication information to the first core network device, or generate another piece of indication information based on the indication information and send the another piece of indication information to the first core network device, where the another piece of indication information is also used to indicate that the PDU session fails to be activated.

In any one of the case 2 to the case 5, after step 808b, the first core network device may perform step 407 of "sending the second downlink information to the second RAN node by the first core network device" in Embodiment 1. In this case, the second downlink information is the same as the first downlink information.

For beneficial effects of the case 1 to the case 5 in Embodiment 3, refer to beneficial effects of corresponding cases in Embodiment 1.

In the methods provided in the foregoing embodiments, that the core network device obtains the current location information of the UE from the first RAN node is merely an example of obtaining the current location information of the UE by the core network device. During actual implementation, the core network device may further obtain the current location information of the UE in another manner, for example, may obtain the current location information of the UE from the second RAN node. In the foregoing embodiments, the valid area of the first downlink information may be at a TA granularity, a base station granularity, a cell granularity, a slice granularity, a slice instance granularity, a UPF granularity, an SMF granularity, a PLMN granularity, or the like. To be specific, the first downlink information is valid for a device in a TA, a device in a coverage area of a base station, a device in a cell, a device in a slice, a device in a serving area of a UPF, a device in a serving area of an SMF, and a device in a PLMN.

In the foregoing embodiments, "the indication information is used to indicate that the PDU session fails to be activated" may also be described as "the indication information is used to indicate that the first core network device re-initiates a PDU session activation procedure"; "the indication information is used to indicate that the PDU session fails to be deactivated" may also be described as "the indication information is used to indicate that the first core network device re-initiates a PDU session deactivation procedure"; "the indication information is used to indicate that the PDU session fails to be updated" may also be described as "the indication information is used to indicate that the first core network device re-initiates a PDU session update procedure"; "the indication information is used to indicate that the PDU session fails to be released" may also be described as "the indication information is used to indicate that the first core network device re-initiates a PDU session release procedure".

In the following embodiments of this application, an example in which the foregoing methods are applied to a 5G network is used to describe the methods provided in the embodiments of this application. It is assumed that UE has two PDU sessions: a first PDU session and a second PDU session, where the first PDU session is in an inactive state, the second PDU session is in an active state, and the first PDU session and the second PDU session are respectively served by an SMF 1 and an SMF 2. First downlink information is used to activate the first PDU session of the UE. A first core network device is the SMF 1, and a second core network device is an AMF. The following methods are applied to a scenario in which the UE moves from a coverage area of a RAN 1 to a coverage area of a RAN 2. UE accessing the RAN 1 is a UPF 1, and UE accessing the RAN 2 is a UPF 2.

Embodiment 1

Figure 9A:
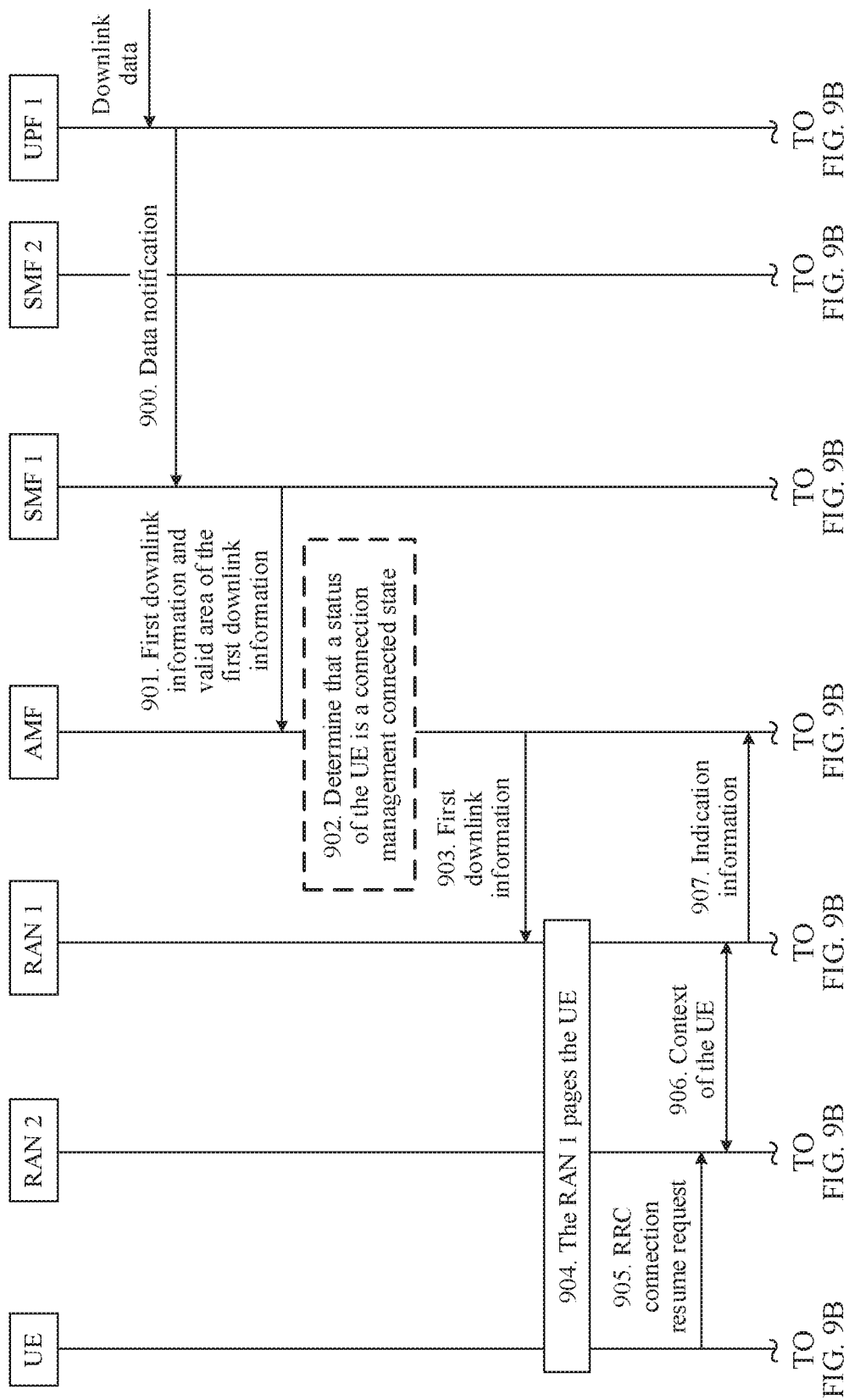
Figure 9B:
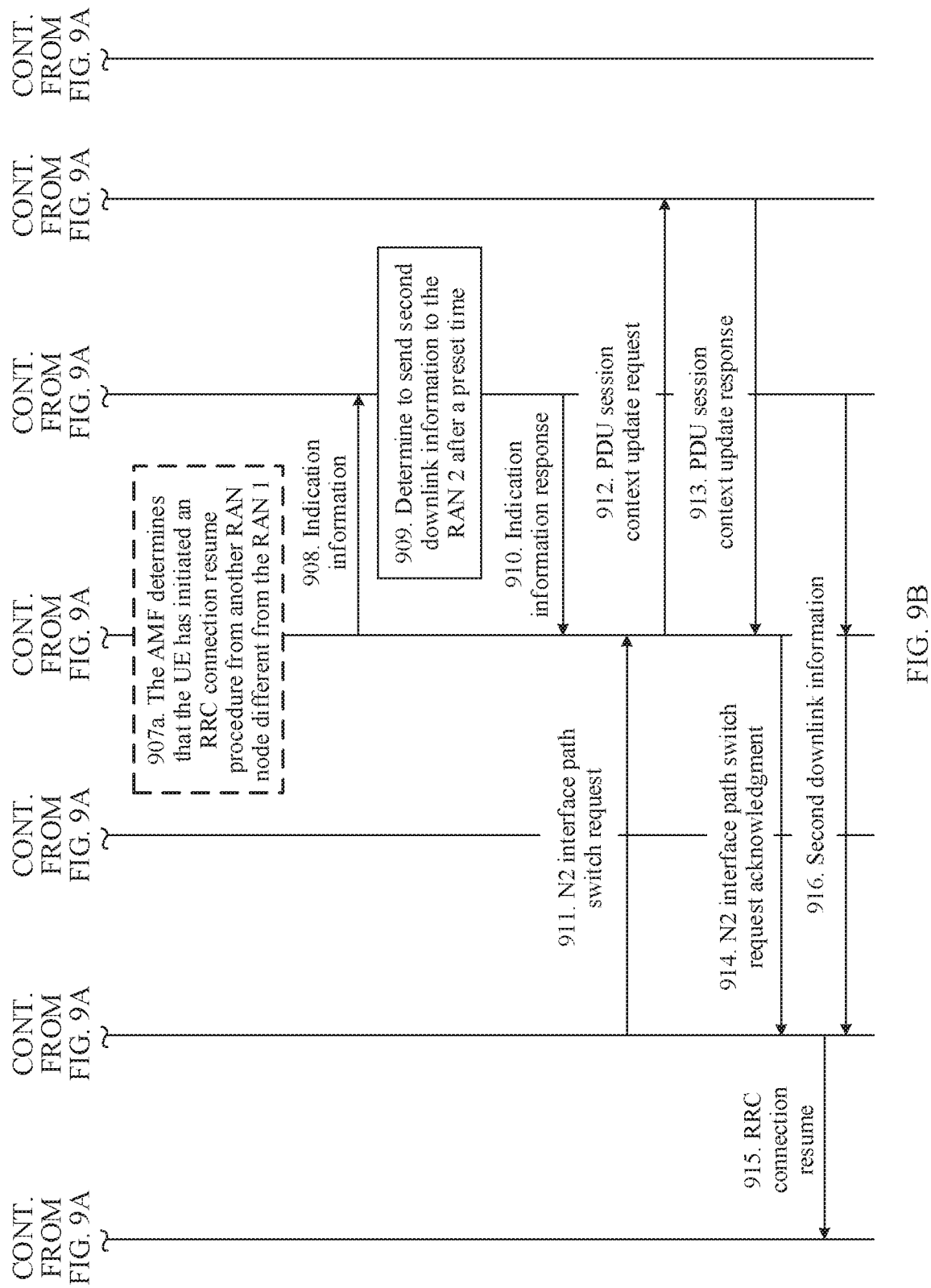

In this embodiment, the AMF sends indication information to the SMF 1, where the indication information is used to indicate that the first PDU session of the UE fails to be activated. Referring to FIG. 9A and FIG. 9B, the method includes the following steps.

900. The UPF 1 sends a data notification to the SMF 1.

After receiving downlink data of the UE, if the UPF 1 determines that a PDU session used to carry the downlink data is in an inactive state, the UPF 1 sends a data notification to an SMF that serves the PDU session, where the data notification is used to notify the SMF 1 that there is downlink data of the UE that needs to be sent. In this embodiment and the following embodiments, an example in which the PDU session that carries the downlink data is the first PDU session is used for description.

A network device 1 sends one piece of information to a network device 2. Correspondingly, the network device 2 receives the information from the network device 1. For example, the UPF 1 sends the data notification to the SMF 1, and the SMF 1 receives the data notification from the UPF 1. In this embodiment of this application, for ease of description, the receiving action performed by the network device 2 is not further described.

901. The SMF 1 sends first downlink information and a valid area of the first downlink information (referred to as a valid area below) to the AMF.

Before step 901, the method may further include: the SMF 1 may determine, based on an N4 interface session identifier that is corresponding to an identifier of the first PDU session and that is included in the data notification, a PDU session that needs to be activated. The first downlink information is information generated by the SMF 1 for the first PDU session.

The first downlink information and the valid area of the first downlink information may be included in an N1 interface message N2 interface message transfer request message (Namf_Communication_N1N2MessageTransfer) that are provided by the AMF.

902. The AMF determines that a status of the UE is a connection management connected state.

The status of the UE is included in a context of the UE that is stored in the AMF.

Step 902 is an optional step.

Step 903 may be directly performed after step 902, or step 903 may be performed when the AMF further determines, based on location information in the stored context of the UE and the valid area, that the UE is located in the valid area.

903. The AMF sends the first downlink information to the RAN 1.

The first downlink information may be included in an N2 interface request (N2 request) message.

904. The RAN 1 pages the UE.

Step 904 may be performed when the RAN 1 determines that the RRC connection mode of the UE is an inactive state.

Before step 904, the AMF may further send, to the SMF 1, an N interface message N2 interface message transfer response message (Namf_Communication_N1N2MessageTransfer response) provided by the AMF, where the message may include information used to indicate that the AMF successfully receives the first downlink information and the valid area of the first downlink information.

If the UE is located in the coverage area of the RAN 2 currently, the method may further include the following steps.

905. The UE sends an RRC connection resume request to the RAN 2.

906. The RAN 2 obtains the context (UE context) of the UE from the RAN 1.

During specific implementation of step 906, the RAN 2 sends a UE context request (retrieve UE context request) to the RAN 1, where the context request includes an identifier (for example, an RRC inactive-radio network temporary identity (I-RNTI for short) of the UE. The RAN 1 sends a UE context response (retrieve UE context response) to the RAN 2, where the context response includes the context of the UE.

907. The RAN 1 sends indication information to the AMF.

The indication information may be included in an N2 interface request acknowledgment (N2 request ack) message.

The indication information is used to indicate that the RAN 1 fails to activate the first PDU session of the UE. For other descriptions of the indication information, refer to the foregoing descriptions. Details are not described herein again.

In another implementation of step 907, the RAN 1 may alternatively send, to the AMF, a message used to indicate that the RAN 1 fails in activating the first PDU session of the UE. For explanations of the message, refer to the foregoing descriptions. Details are not described herein again.

908. The AMF sends the indication information to the SMF 1.

The indication information may be included in a PDU session context update request (Nsmf_PDUSession_UpdateSMContextRequest) provided by the SMF 1.

The indication information sent by the AMF to the SMF 1 is used by the SMF 1 to determine that the first PDU session fails to be activated.

909. The SMF 1 determines to send second downlink information to the RAN 2 after a preset time.

In another implementation of step 909, the SMF 1 sends the second downlink information to the RAN 2 after determining that path switching of the UE or an RRC connection resume procedure is completed. For related descriptions of the preset time, the path switching, and the RRC connection restoration procedure, refer to the foregoing descriptions. Details are not described herein again.

A start time of the preset time in this embodiment and the following embodiments may be a time at which the indication information is received, or may be another time. This is not specifically limited in the embodiments of this application.

910. The SMF 1 sends an indication information response to the AMF, where the indication information response is used to indicate that the SMF 1 successfully receives the indication information.

The indication information response may be included in a PDU session context update response (Nsmf_PDUSession_UpdateSMContextResponse) provided by the SMF 1.

Step 910 is an optional step. For ease of description, this step is not described in the following embodiments.

911. The RAN 2 sends an N2 interface path switch request (N2 path switch request) to the AMF.

The N2 interface path switch request is used to request to perform path switching for the UE. For related descriptions of the path switching, refer to the foregoing descriptions. Details are not described herein again.

912. The AMF sends, to the SMF 2, a PDU session context update request (Nsmf_PDUSession_UpdateSMContextRequest).

The PDU session context update request is used to request to update a context of the second PDU session. This embodiment and the following embodiments are described by using an example in which the RAN 2 accepts the second PDU session.

913. The SMF 2 sends, to the AMF, a PDU session context update response (Nsmf_PDUSession_UpdateSMContextResponse) provided by the SMF 2.

914. The AMF sends an N2 interface path switch request acknowledgment (N2 path switch ack) to the RAN 2.

An objective of step 911 to step 914 is to switch an active PDU session of the UE to the RAN 2. This process may also be performed before step 907. In this case, step 909 may not be performed.

915. The RAN 2 sends an RRC connection resume message to the UE.

Step 905 to step 915 are the RRC connection resume procedure between the UE and the RANs.

Step 915 may also be performed between step 906 and step 911.

916. The SMF 1 sends second downlink information to the RAN 2.

Specifically, the SMF 1 may send the second downlink information to the RAN 2 via the AMF.

The first downlink information and the second downlink information may be the same or may be different. For details, refer to the foregoing related descriptions.

In this embodiment, the AMF may be unaware of the information transmitted between the SMF and the RANs, that is, the AMF transparently transmits the information between the SMF and the RANs. When the AMF is aware of the information transmitted between the SMF and the RANs, step 907a may be further included between step 907 and step 908. Step 907a may be: The AMF determines that the UE initiates the RRC connection resume procedure to another RAN node different from the RAN 1.

Embodiment 2

In this embodiment, the AMF determines, depending on whether an SMF (namely, the SMF 2) serving the second PDU session is the same as the SMF 1, whether to send indication information to the SMF 1.

Figure 10A:
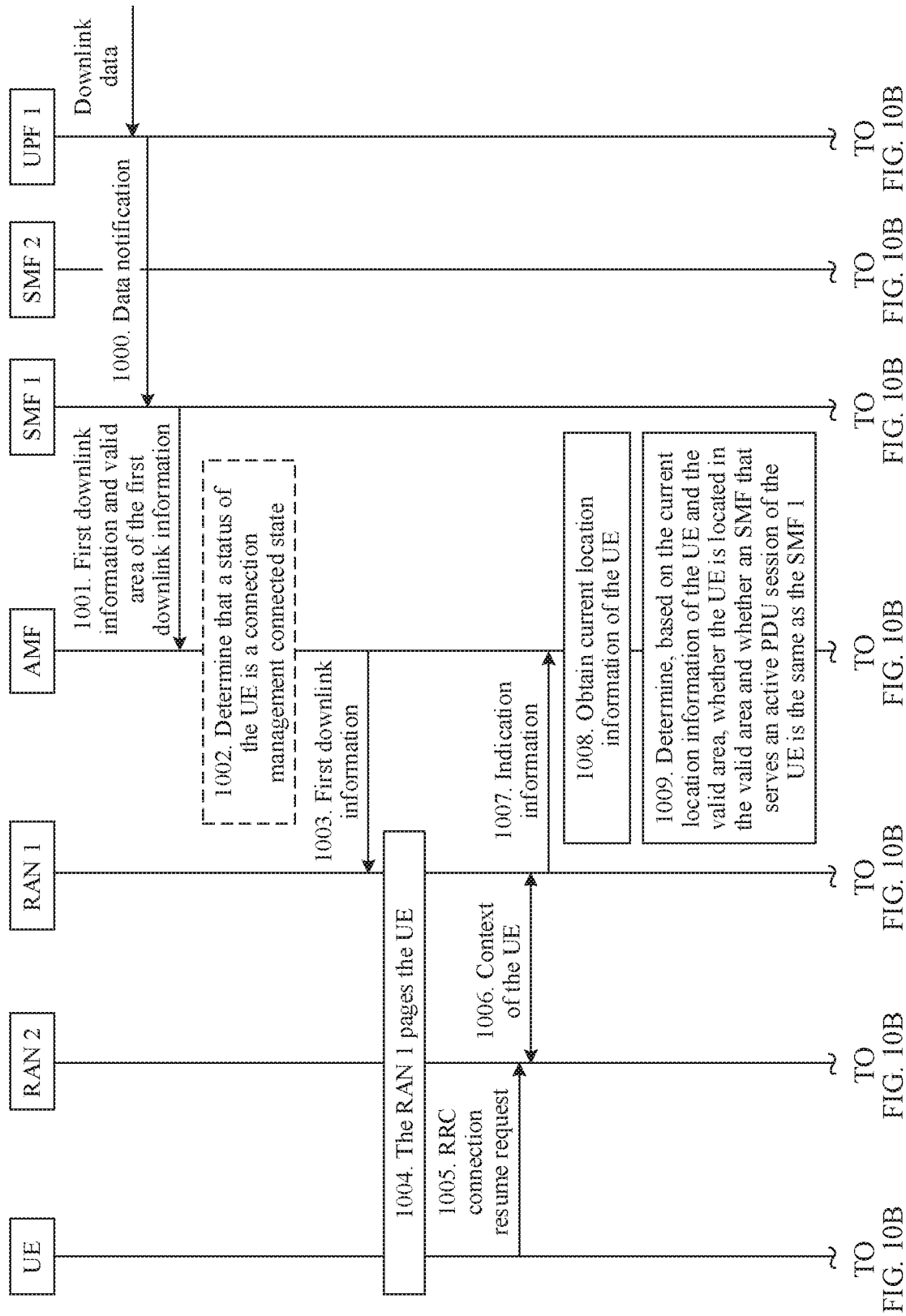
Figure 10B:
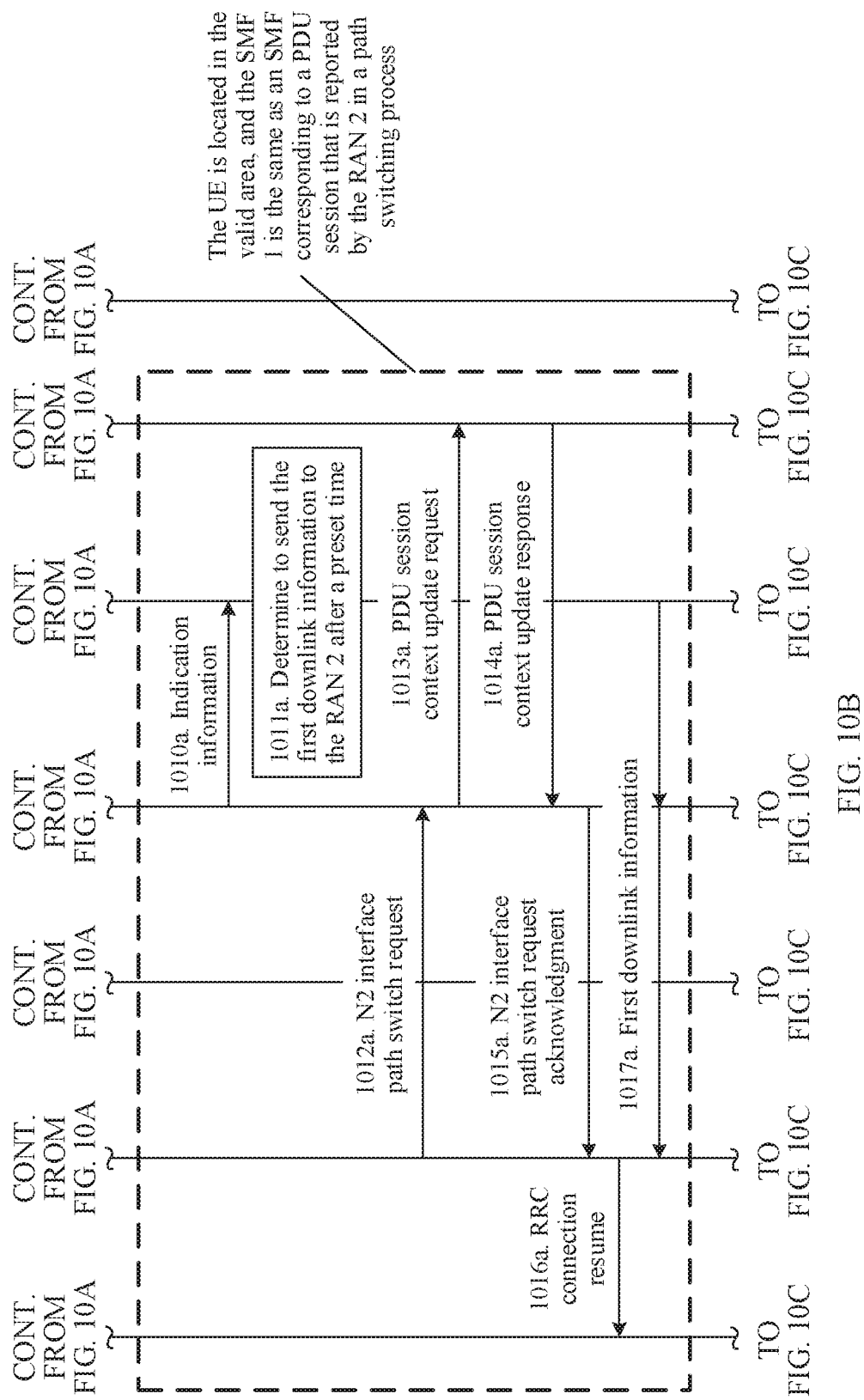
Figure 10C:
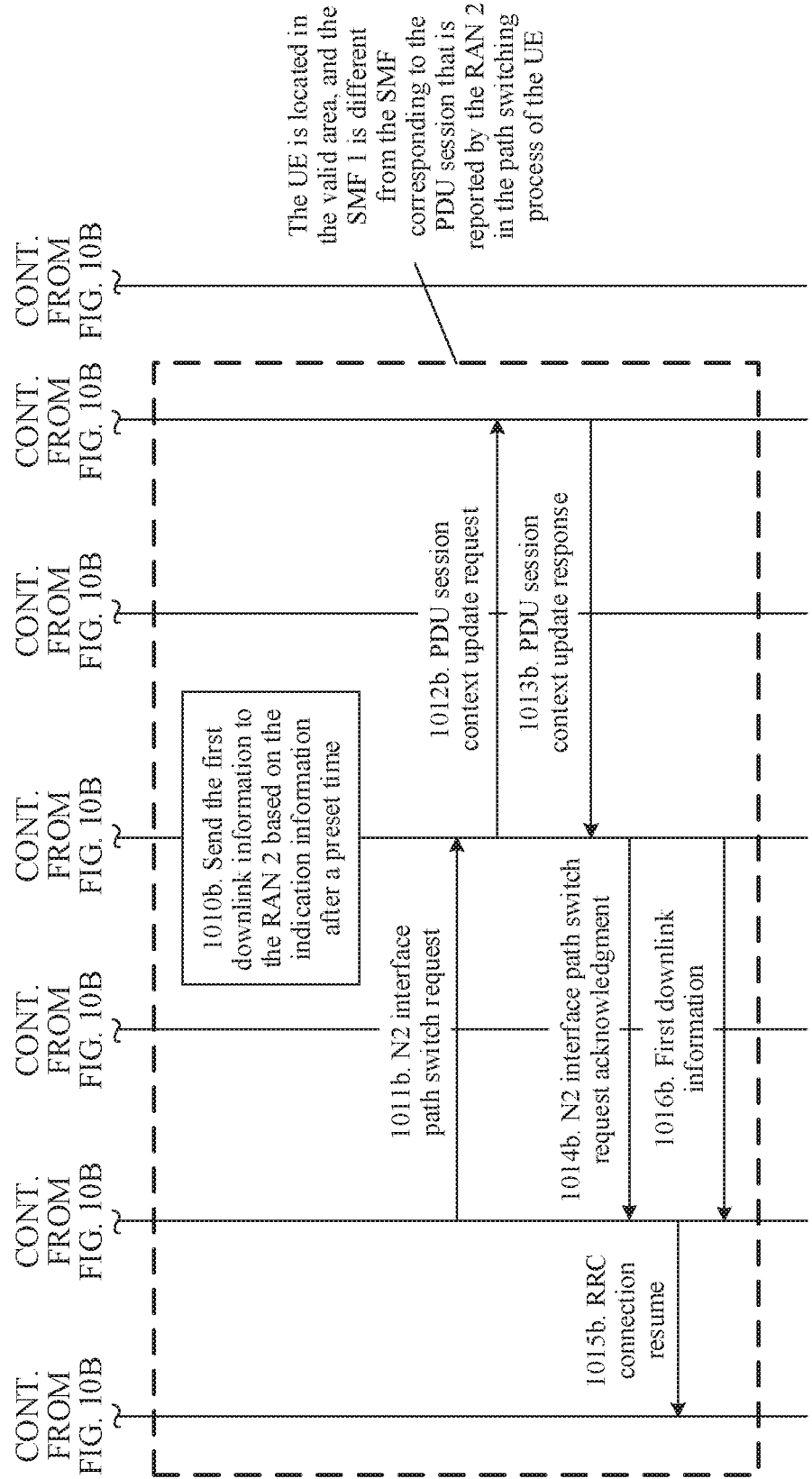

Referring to FIG. 10A to FIG. 10C, the method provided in this embodiment includes the following steps.

Step 1000 to step 1007 are respectively the same as step 900 to step 907.

1008. The AMF obtains current location information of the UE.

Specifically, the AMF may receive the current location information of the UE that is sent by the RAN 1. The current location information of the UE indicates that the UE is located in the coverage area of the RAN 2.

1009. The AMF determines, based on the current location information of the UE and the valid area, whether the UE is located in the valid area and whether an SMF (namely, the SMF 2) that serves an active PDU session of the UE is the same as the SMF 1.

If the AMF determines, based on the current location information of the UE and the valid area, that the UE is located in the valid area and that the SMF 1 is the same as the SMF 2, step 1010a to step 1017a are performed.

1010a. The AMF sends the indication information to the SMF 1.

The indication information may be included in a PDU session context update request provided by the SMF 1.

The indication information sent by the AMF to the SMF 1 is used by the SMF 1 to determine that the first PDU session fails to be activated.

1011a. The SMF 1 determines to send the first downlink information to the RAN 2 after a preset time.

In another implementation of step 1011a, the SMF 1 sends the first downlink information to the RAN 2 after determining that path switching of the UE or an RRC connection resume procedure is completed. For related descriptions of the preset time, the path switching, and the RRC connection restoration procedure, refer to the foregoing descriptions. Details are not described herein again.

Step 1012a to step 1016a are respectively the same as step 911 to step 915.

1017a. The SMF 1 sends the first downlink information to the RAN 2.

In this case, because the UE is located in the valid area, the SMF 1 sends same downlink information to the RAN 1 and the RAN 2. Specifically, the SMF 1 may send the first downlink information to the RAN 2 via the AMF.

If the AMF determines, based on the location information of the UE and the valid area, that the UE is located in the valid area and that the SMF 1 is different from the SMF 2, step 1010b to step 1016b are performed.

1010b. The AMF sends the first downlink information to the RAN 2 after a preset time based on the indication information.

In another implementation of step 1010b, the AMF sends the first downlink information to the RAN 2 after determining that path switching of the UE or the RRC connection resume procedure is completed. For related descriptions of the preset time, the path switching, and the RRC connection restoration procedure, refer to the foregoing descriptions. Details are not described herein again.

Step 1011b to step 1015b are respectively the same as step 911 to step 915.

1016b. The AMF sends the first downlink information to the RAN 2.

In this case, because the UE is located in the valid area, the AMF sends same downlink information to the RAN 1 and the RAN 2.

Embodiment 3

In this embodiment, the SMF 1 may determine, by determining whether the UE is located in the valid area currently, downlink information (the first downlink information or second downlink information) to be sent to the RAN 2.

Figure 11A:
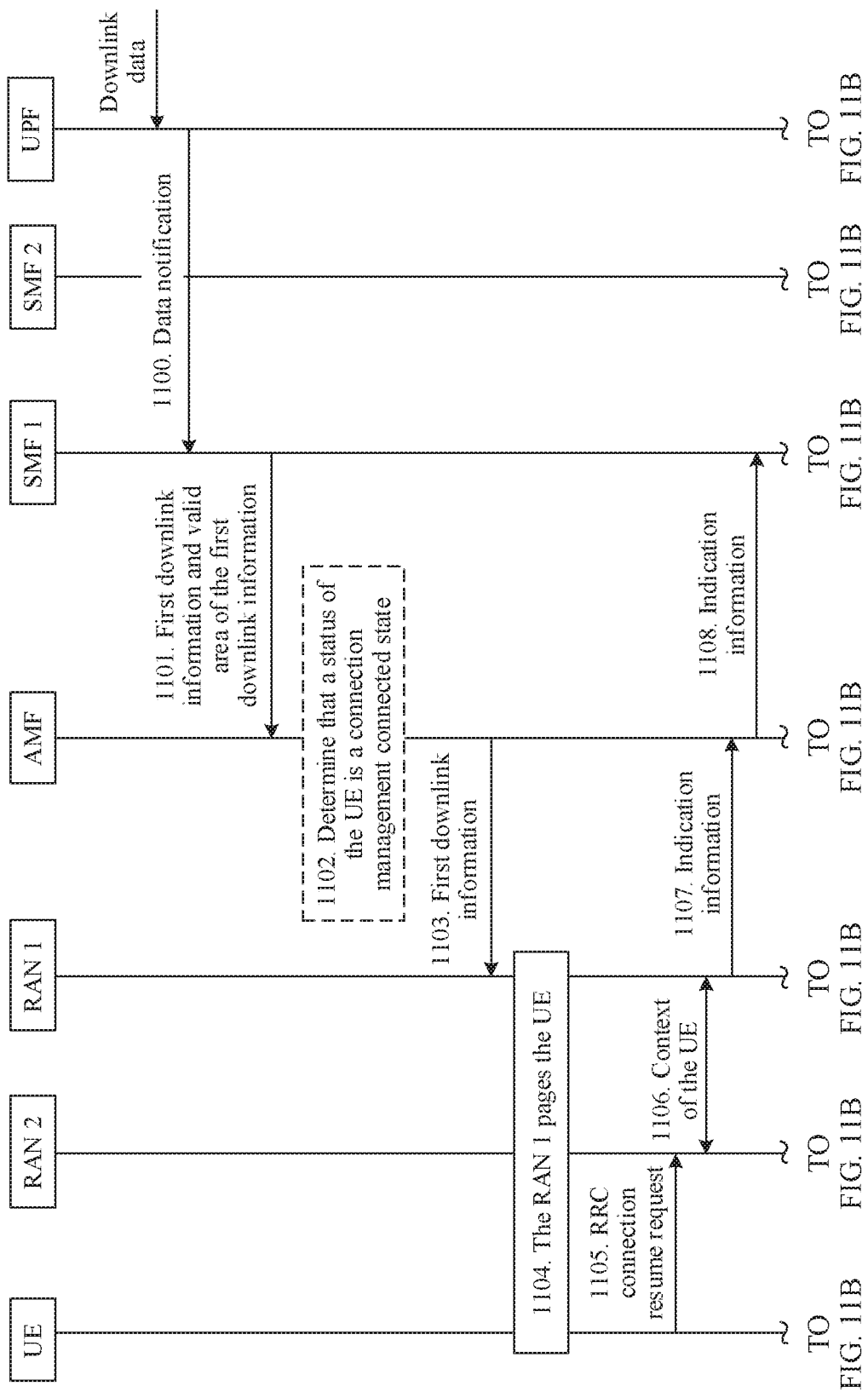
Figure 11B:
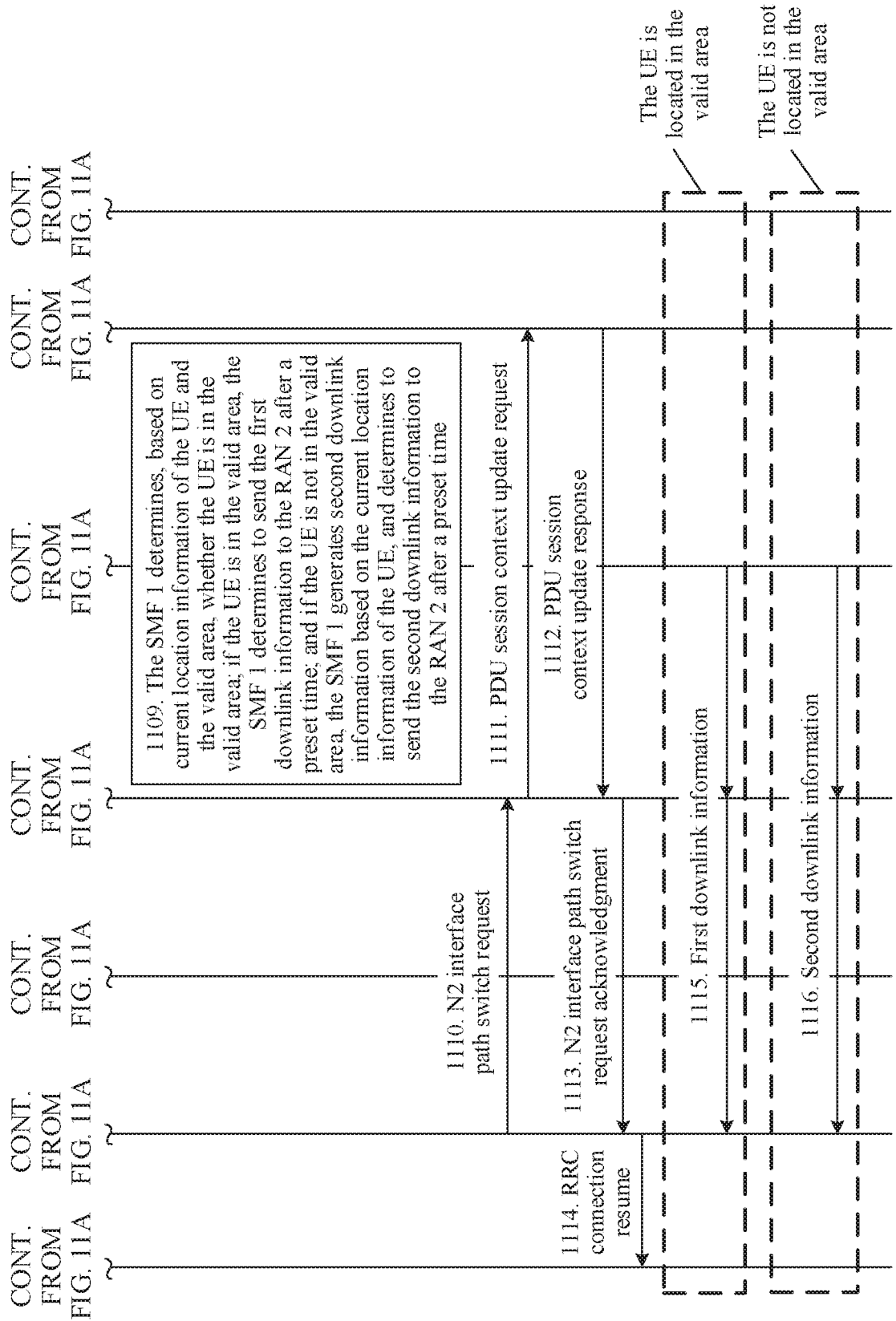

Referring to FIG. 11A and FIG. 11B, the method provided in this embodiment includes the following steps.

Step 1100 to step 1107 are respectively the same as step 900 to step 907.

Step 1108 is the same as step 1010a.

1109. The SMF 1 determines, based on the current location information of the UE and the valid area, whether the UE is in the valid area; if the UE is in the valid area, the SMF 1 determines to send the first downlink information to the RAN 2 after a preset time; and if the UE is not in the valid area, the SMF 1 generates second downlink information based on the current location information of the UE, and determines to send the second downlink information to the RAN 2 after a preset time.

In another implementation of step 1109, when the SMF 1 determines, based on the current location information of the UE and the valid area, that the UE is in the valid area, the SMF 1 may alternatively send the first downlink information to the RAN 2 after determining that path switching or the RRC connection resume procedure of the UE is completed. When the SMF 1 determines, based on the current location information of the UE and the valid area, that the UE is not in the valid area, the SMF 1 may alternatively send second downlink information to the RAN 2 after determining that path switching or the RRC connection resume procedure of the UE is completed. For related descriptions of the preset time, the path switching, and the RRC connection restoration procedure, refer to the foregoing descriptions. Details are not described herein again.

Step 1110 to step 1114 are respectively the same as step 911 to step 915.

If the UE is located in the valid area, step 1115 is performed after step 1114; or if the UE is not located in the valid area, step 1116 is performed after step 1114.

1115. The SMF 1 sends the first downlink information to the RAN 2.

Specifically, the SMF 1 may send the first downlink information to the RAN 2 via the AMF.

1116. The SMF 1 sends the second downlink information to the RAN 2.

Specifically, the SMF 1 may send the second downlink information to the RAN 2 via the AMF.

Embodiment 4

In this embodiment, the AMF obtains current location information of the UE, and performs a subsequent operation based on the current location information of the UE. The AMF may be unaware of information transmitted between the RANs and the SMF. An RRC connection mode of the UE stored in the AMF is an inactive mode, or an RRC connection mode of the UE is not stored in the AMF.

Figure 12A:
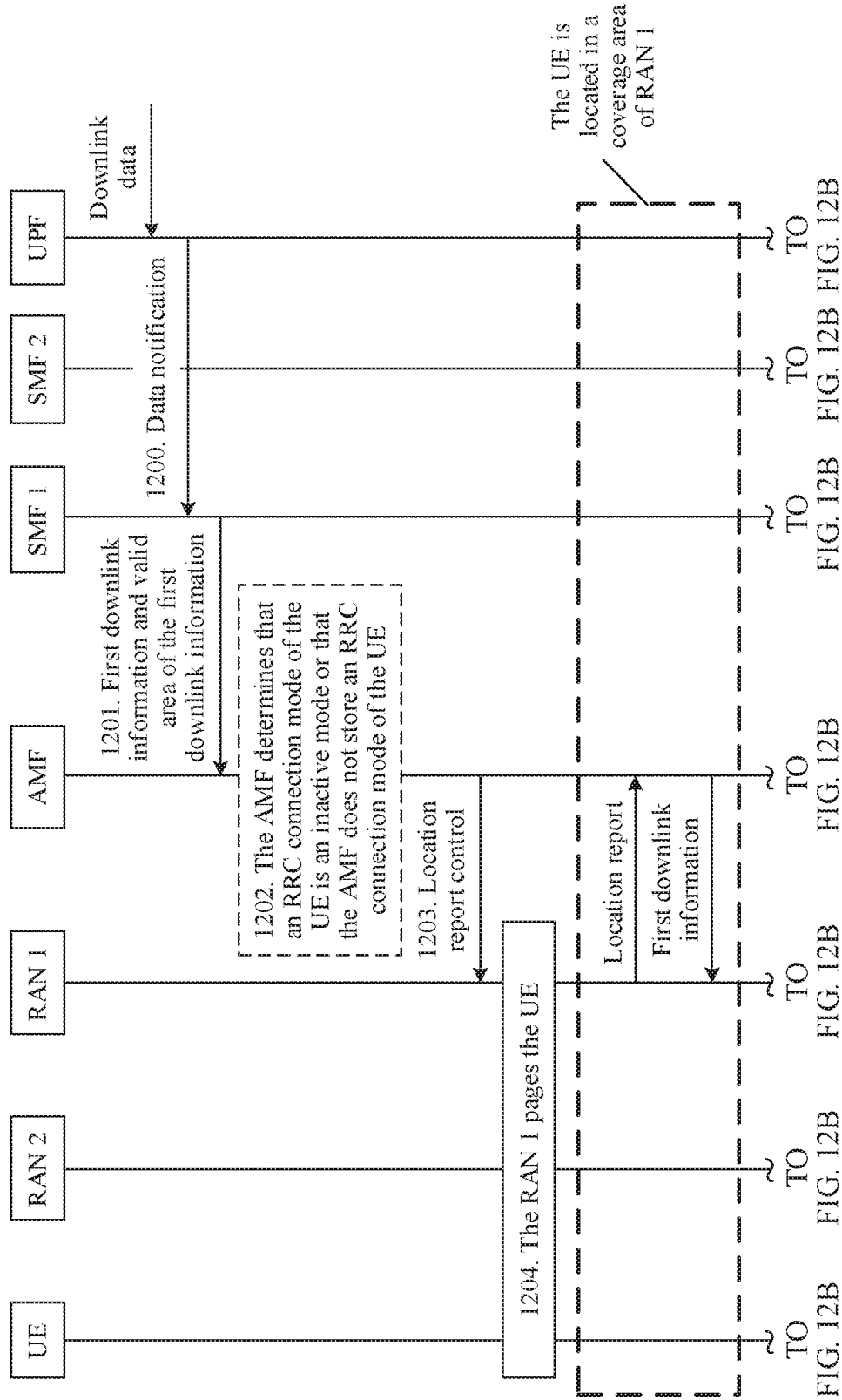
Figure 12B:
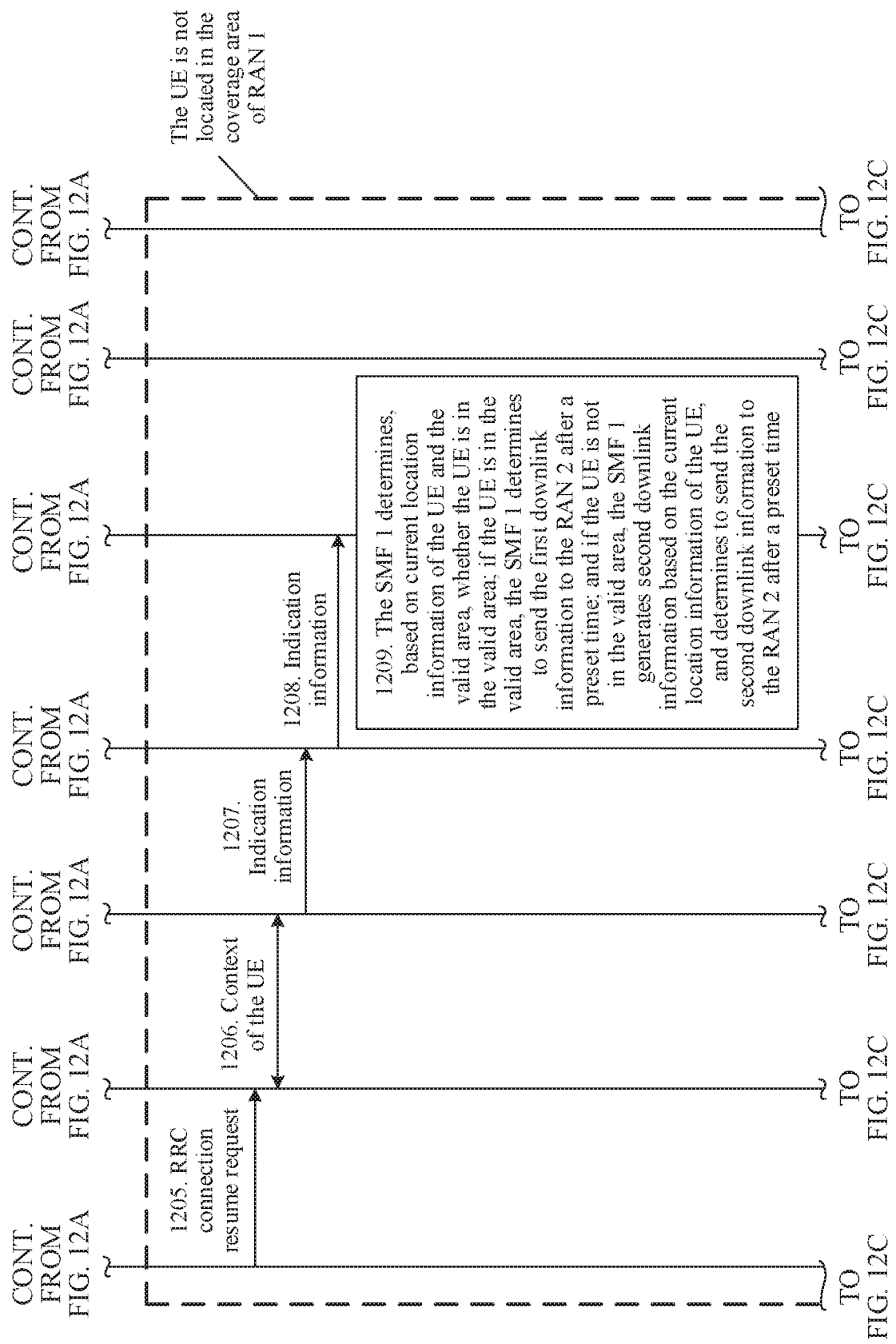
FIG. 12B and FIG. 12C are schematic flowcharts of communication methods according to embodiments of this application.
Figure 12C:
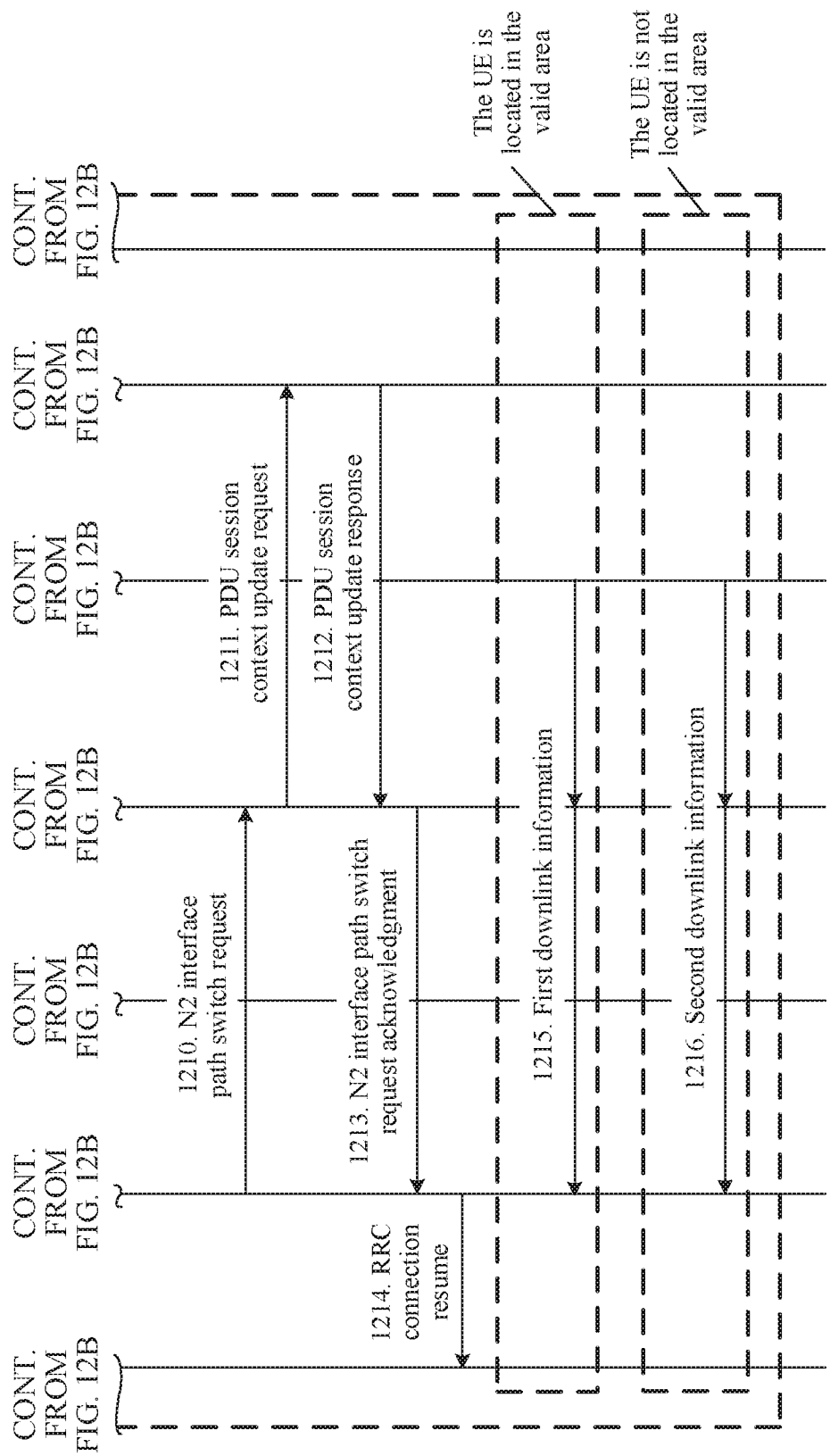

Referring to FIG. 12A to FIG. 12C, the method provided in this embodiment includes the following steps.

Step 1200 and step 1201 are respectively the same as step 900 to step 901.

1202. The AMF determines that the stored RRC connection mode of the UE is an inactive mode or that the AMF does not store the RRC connection mode of the UE.

1203. The AMF sends a location report control message to the RAN 1.

The location report control message is the location request message described above.

1204. The RAN 1 pages the UE.

For related descriptions of step 1204, refer to step 904. Details are not described herein again.

Because the UE is located in the coverage area of the RAN 2 currently, step 1205 to step 1216 may be performed after step 1204.

Step 1205 to step 1216 are respectively the same as step 1105 to step 1116.

The indication information in step 1207 may be included in a location report failure message.

In this embodiment, step 1207 may further include the current location information of the UE. In this case, the AMF may determine whether the UE is in the valid area.

If the UE is in the valid area, the AMF sends the first downlink information to the RAN 2 (for example, may perform step 1010b to step 1016b).

If the UE is not in the valid area, the AMF sends the indication information to the SMF 1. In this case, step 1209 may be replaced with the following: The SMF 1 generates second downlink information based on the current location information of the UE, and determines to send the second downlink information to the RAN 2 after a preset time. Step 1215 is not performed in this case.

It should be noted that, when the UE has not moved to the RAN 2, if the UE is in the coverage area of the RAN 1, the RAN 1 may send a location report message to the AMF. The location report message includes the current location information of the UE. In this case, the RAN 1 may activate the first PDU session based on the first downlink information. Therefore, the AMF sends the first downlink information to the RAN 1.

The foregoing mainly describes the solutions provided in the embodiments of this application from a perspective of the method. It can be understood that, to implement the foregoing functions, the communications apparatus includes a corresponding hardware structure and/or software module for performing each function. A person skilled in the art should easily be aware that, in combination with units and algorithm steps of the examples described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the communications apparatus may be divided into function modules based on the foregoing method examples. For example, each function module may be obtained through division based on each corresponding function, or two or more functions may be integrated into one processing module. The integrated module may be implemented in a form of hardware, or may be implemented in a form of a software functional module. It should be noted that, in the embodiments of this application, the division into modules is an example, and is merely a logical function division. In actual implementation, another division manner may be used.

Figure 13:
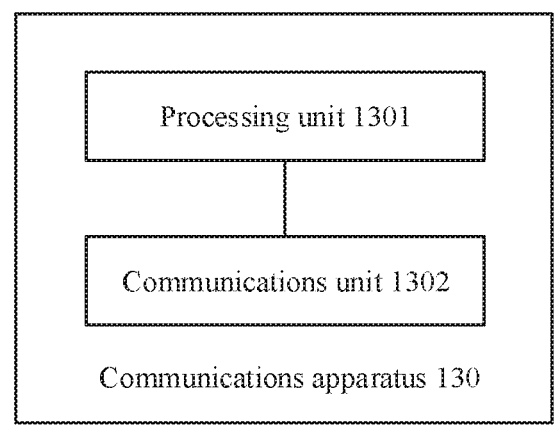
FIG. 13 is a schematic composition diagram of a communications apparatus according to an embodiment of this application.

Referring to FIG. 13, an embodiment of this application provides a communications apparatus. The apparatus 130 may be applied to a scenario in which a terminal whose RRC connection mode is an inactive mode moves from a coverage area of a first RAN node to a coverage area of a second RAN node. The apparatus 130 may be configured to perform actions of the first core network device (in FIG. 9A to FIG. 12C, the first core network device may be the SMF 1) in the foregoing method embodiments. The apparatus 130 may be a first core network device, or may be a chip or a system on chip. This is not limited.

Specifically, the apparatus 130 may include a communications unit 1302 and a processing unit 1301.

The processing unit 1301 is configured to send first downlink information to the first RAN node via the communications unit 1302, where the first downlink information is used by the first RAN node to activate a packet data unit PDU session of the terminal, and the PDU session is in an inactive state.

The processing unit 1301 is further configured to receive indication information from the first RAN node via the communications unit 1302, where the indication information is used to indicate that the PDU session fails to be activated.

The processing unit 1301 is further configured to send, via the communications unit, second downlink information to the second RAN node based on the indication information, where the second downlink information is used by the second RAN node to activate the PDU session of the terminal.

Optionally, the processing unit 1301 is further configured to:

generate the second downlink information based on current location information of the terminal when determining, based on the current location information of the terminal, that the terminal is not located in a valid area of the first downlink information.

Optionally, the processing unit 1301 is further configured to:

determine, based on current location information of the terminal, that the terminal is located in a valid area of the first downlink information, where the first downlink information and the second downlink information are the same information.

Optionally, the processing unit 1301 is further configured to receive the current location information of the terminal from the first RAN node via the communications unit 1302.

Optionally, the indication information is a failure cause value, and the failure cause value is a cause of a failure in activating the PDU session.

Referring to FIG. 13, an embodiment of this application provides a communications apparatus. The apparatus 130 may be applied to a scenario in which a terminal whose RRC connection mode is an inactive mode moves from a coverage area of a first RAN node to a coverage area of a second RAN node. The apparatus 130 may be configured to perform actions of the first RAN node (in FIG. 9A to FIG. 12C, the first RAN node may be the RAN 1) in the foregoing method embodiments. The apparatus 130 may be a first RAN node, or may be a chip or a system on chip. This is not limited.

Specifically, the apparatus 130 includes a communications unit 1302 and a processing unit 1301.

The communications unit 1302 is configured to receive first downlink information of the terminal from a first core network device, where the first downlink information is used by the apparatus to activate a packet data unit PDU session of the terminal, and the PDU session is in an inactive state.

The processing unit 1301 is configured to page the terminal based on the first downlink information when the RRC connection mode of the terminal is an inactive mode.

The communications unit 1302 is further configured to receive a context request of the terminal from the second RAN node.

The communications unit 1302 is further configured to send indication information to the first core network device based on the context request, where the indication information is used to indicate that the PDU session fails to be activated.

Optionally, the communications unit 1302 is further configured to send current location information of the terminal to the first core network device.

Optionally, the indication information is a failure cause value, and the failure cause value is a cause of a failure in activating the PDU session.

Referring to FIG. 13, an embodiment of this application provides a communications apparatus. The apparatus 130 may be applied to a scenario in which a terminal whose RRC connection mode is an inactive mode moves from a coverage area of a first RAN node to a coverage area of a second RAN node. The apparatus 130 may be configured to perform related actions of the second core network device in the foregoing method embodiments. The apparatus 130 may be a second core network device, or may be a chip or a system on chip. This is not limited.

Specifically, the apparatus 130 includes a communications unit 1302 and a processing unit 1301.

The processing unit 1301 is configured to: receive first downlink information from a first core network device via the communications unit 1302, and send the first downlink information to the first RAN node via the communications unit, where the first downlink information is used to activate a packet data unit PDU session of the terminal, and the PDU session is in an inactive state.

The processing unit 1301 is further configured to receive, from the first RAN node via the communications unit, a message used to indicate that the PDU session fails to be activated.

The processing unit 1301 is further configured to send, via the communications unit 1302, the first downlink information to the second RAN node based on the message.

Optionally, the processing unit 1301 is further configured to:

receive, from the first core network device, information about a valid area of the first downlink information via the communications unit 1302; and send, via the communications unit, the first downlink information to the second RAN node based on the message when determining, based on current location information of the terminal and the information about the valid area of the first downlink information, that the terminal is located in the valid area.

Optionally, the processing unit 1301 is further configured to:

receive, from the first core network device, information about a valid area of the first downlink information via the communications unit 1302; and send, via the communications unit, the first downlink information to the first RAN node when a status of the terminal in the apparatus is a connection management connected state and when determining, based on location information in a stored context of the terminal and the information about the valid area, that the terminal is located in the valid area.

Optionally, the processing unit 1301 is further configured to receive the current location information of the terminal from the first RAN node via the communications unit 1302.

Optionally, a message type or a message name of the message is used to indicate that the PDU session fails to be activated; or the message includes indication information, where the indication information is a failure cause value, and the failure cause value is used to indicate a cause of a failure in activating the PDU session.

Referring to FIG. 13, an embodiment of this application provides a communications apparatus. The apparatus 130 may be applied to a scenario in which a terminal whose RRC connection mode is an inactive mode moves from a coverage area of a first RAN node to a coverage area of a second RAN node. The apparatus 130 may be configured to perform actions of the second core network device (in FIG. 9A to FIG. 12C, the second core network device may be the AMF) in the foregoing method embodiments. The apparatus 130 may be a second core network device, or may be a chip or a system on chip. This is not limited.

Specifically, the apparatus 130 includes a communications unit 1302 and a processing unit 1301.

The processing unit 1301 is configured to: receive first downlink information from a first core network device via the communications unit 1302, and send the first downlink information to the first RAN node via the communications unit, where the first downlink information is used to activate a packet data unit PDU session of the terminal, and the PDU session is in an inactive state.

The processing unit 1301 is further configured to receive, from the first RAN node via the communications unit 1302, a message used to indicate that the PDU session fails to be activated.

The processing unit 1301 is further configured to send, via the communications unit 1302, indication information to the first core network device based on the message, where the indication information is used to indicate that the PDU session fails to be activated.

Optionally, the processing unit 1301 is further configured to:

receive, from the first core network device, information about a valid area of the first downlink information via the communications unit; and send, via the communications unit, the indication information to the first core network device based on the message when determining, based on current location information of the terminal and the information about the valid area of the first downlink information, that the terminal is not located in the valid area.

Optionally, the processing unit 1301 is further configured to:

receive, from the first core network device, information about a valid area of the first downlink information via the communications unit 1302; and send, via the communications unit, the first downlink information to the first RAN node when a status of the terminal in the apparatus is a connection management connected state and when determining, based on location information in a stored context of the terminal and the information about the valid area, that the terminal is located in the valid area.

Optionally, the processing unit 1301 is further configured to receive the current location information of the terminal from the first RAN node via the communications unit 1302.

Optionally, the indication information is a failure cause value, and the failure cause value is a cause of a failure in activating the PDU session.

An embodiment of this application further provides a computer-readable storage medium, including an instruction. When the instruction is run on a computer, the computer is enabled to perform the actions of the first core network device, the second core network device, or the first RAN node in the foregoing method embodiments.

An embodiment of this application further provides a computer program product including an instruction. When the computer program product runs on a computer, the computer is enabled to perform the actions of the first core network device, the second core network device, or the first RAN node in the foregoing method embodiments.

An embodiment of this application further provides a communications system, including the first core network device and the first RAN node in the foregoing embodiments.

Optionally, the system further includes the foregoing second core network device. Refer to the embodiment shown in FIG. 7 or FIG. 8.

Optionally, the system further includes the foregoing second RAN node.

Refer to the embodiment shown in FIG. 6, FIG. 7, or FIG. 8.

All or some of the foregoing embodiments may be implemented by using software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from one computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL for short)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD) a semiconductor medium (for example, a solid-state drive (SSD for short)), or the like.

Although this application is described with reference to the embodiments, in a process of implementing this application that claims protection, persons skilled in the art may understand and implement another variation of the disclosed embodiments by viewing the accompanying drawings, disclosed content, and the accompanying claims. In the claims, "comprising" does not exclude another component or another step, and "a" or "one" does not exclude a meaning of plurality. A single processor or another unit may implement several functions enumerated in the claims. Some measures are recorded in dependent claims that are different from each other, but this does not mean that these measures cannot be combined to produce a better effect.

Although this application is described with reference to specific features and the embodiments thereof, definitely, various modifications and combinations may be made to them without departing from the spirit and scope of this application. Correspondingly, the specification and accompanying drawings are merely example description of this application defined by the accompanying claims, and is considered as any of or all modifications, variations, combinations or equivalents that cover the scope of this application. Definitely, a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A communication method, wherein the method is applied to a scenario in which a terminal moves from a coverage area of a first radio access network (RAN) node to a coverage area of a second RAN node, and the method comprises:
    sending, by a first core network device, first downlink information to the first RAN node, wherein the first downlink information is for the first RAN node to active a packet data unit (PDU) session of the terminal, and the PDU session is in an inactive state;
    receiving, by the first RAN node, the first downlink information from the first core network device;
    paging, by the first RAN node, the terminal based on the first downlink information in response to determining that a radio resource control (RRC) connection mode of the terminal is an inactive mode;
    receiving, by the first RAN node, a context request of the terminal from the second RAN node; and
    sending, by the first RAN node, indication information to the first core network device based on the context request, wherein the indication information indicates that the PDU session fails to be activated;
    receiving, by the first core network device, the indication information from the first RAN node; and
    sending, by the first core network device, second downlink information to the second RAN node based on the indication information after path switching from the first RAN node to the second RAN node is completed, wherein the second downlink information is for the second RAN node to activate the PDU session of the terminal.

2. The method according to claim 1, wherein the first downlink information is N2session management (SM) information.

3. The method according to claim 2, wherein the N2 SM information comprises:
    a quality of service (QoS) profile and core network N3 interface tunnel information.

4. The method according to claim 1, wherein the indication information comprises a failure cause value, and the failure cause value indicates a cause of a failure in activating the PDU session.

5. The method according to claim 4, wherein the cause of the failure comprises:
    that the terminal initiates a RRC connection resume procedure to another RAN node different from the first RAN node, that the terminal is performing a handover; context transfer; that the terminal is unreachable at the first RAN node; or that the first downlink information is not transmitted.

6. A communication system, comprising:
    a first core network device, configured to send first downlink information to a first radio access network (RAN) node, wherein the first downlink information is for the first RAN node to activate a packet data unit (PDU) session of a terminal, the PDU session is in an inactive state, and the terminal moves from a coverage area of the first RAN node to a coverage area of a second RAN node;
    the first RAN node, configured to:
        receive the first downlink information from the first core network device;
        page the terminal based on the first downlink information in response to determining that a radio resource control (RRC) connection mode of the terminal is an inactive mode;
        receive a context request of the terminal from the second RAN node; and
        send indication information to the first core network device based on the context request, wherein the indication information indicates that the PDU session fails to be activated; and
    wherein the first core network device is further configured to:
        receive the indication information from the first RAN node; and
        send second downlink information to the second RAN node based on the indication information after path switching from the first RAN node to the second RAN node is completed, wherein the second downlink information is for the second RAN node to activate the PDU session of the terminal.

7. The system according to claim 6, wherein the first downlink information is N2 session management (SM) information.

8. The system according to claim 7, wherein the N2 SM information comprises: a quality of service (QoS) profile and core network N3 interface tunnel information.

9. The system according to claim 6, wherein the indication information comprises a failure cause value, and the failure cause value indicates a cause of a failure in to activate the PDU session.

10. The system according to claim 9, wherein the cause of the failure comprises:
    that the terminal initiates a RRC connection resume procedure to another RAN node different from the first RAN node; that the terminal is performing a handover; context transfer; that the terminal is unreachable at the first RAN node; or that the first downlink information is not transmitted.

11. A communication apparatus, comprising:
    at least one processor; and
    a non-transitory computer-readable storage medium coupled to the at least one processor and storing programming instructions for execution by the at least one processor, wherein the programming instructions instruct the at least one processors to perform operations comprising:
    receiving first downlink information from a first core network device, wherein the first downlink information is for a first radio access network (RAN) node to activate a packet data unit (PDU) session of a terminal, the PDU session is in an inactive state, and the terminal moves from a coverage area of the first RAN node to a coverage area of a second RAN node;
    paging the terminal based on the first downlink information in response to determining that a radio resource control (RRC) connection mode of the terminal is an inactive mode;
    receiving a context request of the terminal from the second RAN node; and
    sending indication information to the first core network device based on the context request, wherein the indication information indicates that the PDU session fails to be activated.

12. The apparatus according to claim 11, wherein the first downlink information is N2 session management (SM) information.

13. The apparatus according to claim 12, wherein the N2 SM information comprises: a quality of service (QoS) profile and core network N3 interface tunnel information.

14. The apparatus according to claim 11, wherein the indication information is a failure cause value, and the failure cause value indicates a cause of a failure in to activate the PDU session.

15. The apparatus according to claim 14, wherein the cause of the failure comprises: that the terminal initiates a RRC connection resume procedure to another RAN node different from the first RAN node; that the terminal is performing a handover;
    context transfer; that the terminal is unreachable at the first RAN node; or that the first downlink information is not transmitted.

16. The method according to claim 1, wherein the path switching from the first RAN node to the second RAN node comprises switching a transmission path for control plane signaling of the terminal and a transmission path for user plane data of the terminal that are between the first RAN node and the first core network device to transmission paths between the second RAN node and the first core network device.

17. The system according to claim 9, wherein the path switching from the first RAN node to the second RAN node comprises switching a transmission path for control plane signaling of the terminal and a transmission path for user plane data of the terminal that are between the first RAN node and the first core network device to transmission paths between the second RAN node and the first core network device.

* * * * *

UNITED STATES PATENT AND TRADEMARK OFFICE
CERTIFICATE OF CORRECTION

PATENT NO. : 11,470,671 B2
APPLICATION NO. : 17/066927
DATED : October 11, 2022
INVENTOR(S) : Jiangwei Ying et al.

Page 1 of 1

It is certified that error appears in the above-identified patent and that said Letters Patent is hereby corrected as shown below:

In the Claims

In Column 55, In Line 41, In Claim 2, delete "N2session" and insert -- N2 session --.

Signed and Sealed this
Sixteenth Day of May, 2023

Katherine Kelly Vidal
*Director of the United States Patent and Trademark Office*